(12) United States Patent
Hoelldorfer et al.

(10) Patent No.: US 10,946,578 B2
(45) Date of Patent: Mar. 16, 2021

(54) 3-D PRINTING DEVICE

(71) Applicant: Apium Additive Technologies GmbH, Karlsruhe (DE)

(72) Inventors: Andreas Johann Walter Hoelldorfer, Karlsruhe (DE); Uwe Wolfgang Popp, Karlsruhe (DE); Lars Pfotzer, Karlsruhe (DE); Brando Okolo, Durmersheim (DE); Tony Tran-Mai, Karlsruhe (DE)

(73) Assignee: Apium Additive Technologies GmbH, Karlsruhe (DE)

( * ) Notice: Subject to any disclaimer, the term of this patent is extended or adjusted under 35 U.S.C. 154(b) by 339 days.

(21) Appl. No.: 15/743,363

(22) PCT Filed: Jul. 15, 2016

(86) PCT No.: PCT/DE2016/100318
§ 371 (c)(1),
(2) Date: Jan. 10, 2018

(87) PCT Pub. No.: WO2017/008789
PCT Pub. Date: Jan. 19, 2017

(65) Prior Publication Data
US 2018/0200955 A1 Jul. 19, 2018

(30) Foreign Application Priority Data

Jul. 15, 2015 (DE) ...................... 10 2015 111 504.2

(51) Int. Cl.
*B29C 64/10* (2017.01)
*B29C 64/118* (2017.01)
(Continued)

(52) U.S. Cl.
CPC .......... *B29C 64/118* (2017.08); *B29C 64/209* (2017.08); *B29C 64/259* (2017.08);
(Continued)

(58) Field of Classification Search
CPC ..... B29C 64/295; B29C 64/106; B29C 64/20; B29C 64/336; B29C 64/393;
(Continued)

(56) References Cited

U.S. PATENT DOCUMENTS 9,011,982 B2  4/2015 Muller et al.
2013/0161439 A1*  6/2013 Beery ................... B29C 64/321
242/396.1
(Continued)

FOREIGN PATENT DOCUMENTS

DE  10 2013 111 387 A1  4/2015
DE  102013111387 A1 *  4/2015  ............. B33Y 80/00
(Continued)

OTHER PUBLICATIONS

International Search Report of PCT/DE2016/100318, dated Oct. 12, 2016.

*Primary Examiner* — Joseph S Del Sole
*Assistant Examiner* — Jamel M Nelson
(74) *Attorney, Agent, or Firm* — Collard & Roe, P.C.

(57) ABSTRACT

A 3-D printing device, in particular an FFF printing device, comprising at least one printing head unit and at least one feeding device for feeding a printing material to the at least one printing head unit in at least one operating state. According to the invention, the printing head unit is provided for melting a printing material formed at least partially of a high-performance plastic, in particular of a high-performance thermoplastic, in at least one operating state.

9 Claims, 9 Drawing Sheets

Figure 1:
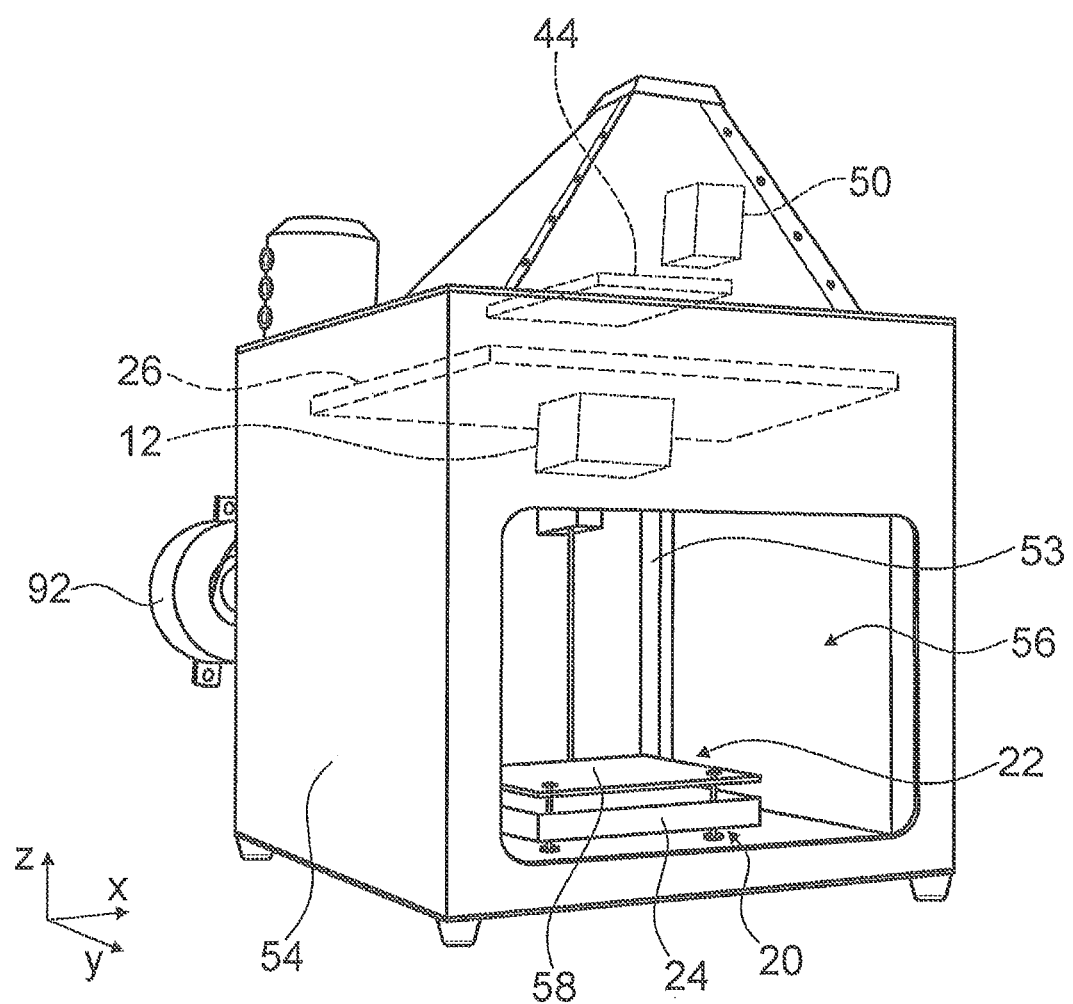

(51) Int. Cl.
*B33Y 70/00* (2020.01)
*B33Y 30/00* (2015.01)
*B33Y 10/00* (2015.01)
*B33Y 50/02* (2015.01)
*B29C 64/259* (2017.01)
*B29C 64/295* (2017.01)
*B29C 64/209* (2017.01)
*B29C 64/393* (2017.01)
*B29C 64/336* (2017.01)
*B29K 71/00* (2006.01)

(52) U.S. Cl.
CPC .......... *B29C 64/295* (2017.08); *B29C 64/336* (2017.08); *B29C 64/393* (2017.08); *B33Y 10/00* (2014.12); *B33Y 30/00* (2014.12); *B33Y 50/02* (2014.12); *B33Y 70/00* (2014.12); *B29K 2071/00* (2013.01); *B29K 2995/002* (2013.01)

(58) Field of Classification Search
CPC ... B29C 64/209; B29C 64/118; B29C 64/259; B33Y 50/02; B33Y 10/00; B33Y 30/00; B33Y 70/00
See application file for complete search history.

(56) References Cited

U.S. PATENT DOCUMENTS

| | | | | |
|---|---|---|---|---|
| 2013/0327917 | A1* | 12/2013 | Steiner | B33Y 40/00 248/649 |
| 2014/0291886 | A1 | 10/2014 | Mark et al. | |
| 2015/0028523 | A1* | 1/2015 | Jaker | B29C 64/40 264/401 |
| 2015/0056319 | A1* | 2/2015 | Din | B29C 64/106 425/162 |

FOREIGN PATENT DOCUMENTS

| | | | |
|---|---|---|---|
| EP | 2 329 935 A1 | 6/2011 | |
| EP | 2329935 A1 * | 6/2011 | ............. B29C 64/20 |
| EP | 3 002 113 A1 | 4/2016 | |
| EP | 3002113 A1 * | 4/2016 | ............. B33Y 30/00 |
| JP | 2010-527810 A | 8/2010 | |
| WO | 2015/077053 A1 | 5/2015 | |

* cited by examiner

3-D PRINTING DEVICE

CROSS REFERENCE TO RELATED APPLICATIONS

This application is the National Stage of PCT/DE2016/100318 filed on Jul. 15, 2016, which claims priority under 35 U.S.C. § 119 of German Application No. 10 2015 111 504.2 filed on Jul. 15, 2015, the disclosure of which is incorporated by reference. The international application under PCT article 21(2) was not published in English.

STATE OF THE ART

The invention relates to a 3D printing device.

A 3D printing device, in particular an FFF printing device, having at least one printing head unit and having at least one feed device, which is provided, in at least one operating state, to feed a printing material to the at least one printing head unit, is already known from US 2015/0028523 A1. In connection with this previously known printing device, different high-performance plastics are proposed as the construction material. Furthermore, this 3D printing device has a feed device with which printing material in the form of a filament is supplied to the printing head unit. Furthermore, this feed device is provided with a transport element, in order to move the printing material at a defined advancing speed. Furthermore, this printing device is provided with a heatable printing baseplate.

A 3D printing device is also previously known from US 2013/0327917 A1, in which a cooling device is associated with the printing baseplate.

A 3D printing device is also previously known from EP 2 329 935 A1, which has a chamber for holding a substrate carrier, as well as a conveying module for the printing material and a dispensing nozzle for dispensing the modeling substance, so that this is a 3D printer in which the three-dimensional printed shape is applied to the substrate carrier during the printing process. In this regard, a radiation heating system is associated with the substrate carrier, which system is equipped with multiple temperature sensors and comprises multiple heating radiators that can be regulated separately.

The task of the invention consists, in particular, of making available a device of the stated type, having improved properties with regard to the processability of technical plastics. This task is accomplished, according to the invention, by means of the characteristics of claim 1, while advantageous embodiments and further developments of the invention can be derived from the dependent claims.

Advantages of the Invention

The invention proceeds from a 3D printing device, in particular from an FFF printing device, having at least one printing head unit and having at least one feed device, which is provided for feeding a printing material to the at least one printing head unit in at least one operating state.

It is proposed that the printing head unit is provided, in at least one operating state, to melt a printing material that is formed, at least in part, by a high-performance plastic, in particular a high-performance thermoplastic. Preferably, the printing head unit is provided, in at least one operating state, to melt a printing material that is formed, at least in part, by a PAEK, particularly preferably by a PEEK and/or PEKK. In this connection, a "3D printing device" should be understood, in particular, to be a device that is provided for three-dimensional construction of a workpiece. Preferably, it should be understood, in particular, to be a device that is provided for construction of a workpiece, particularly layer by layer, from a material. In this regard, construction of the workpiece takes place additively, in particular. Particularly preferably, it should be understood to be, in particular, a computer-controlled device that is provided for production of an individual workpiece, in particular in accordance with a CAD model. In this regard, a workpiece is constructed, in particular, by means of melting a material. Furthermore, in this connection, an FFF printing device should be understood to mean, in particular, a 3D printing device in which a workpiece is constructed by means of "Fused Filament Fabrication," in particular by means of "Fused Deposition Modeling." In this regard, "Fused Filament Fabrication" describes, in particular, a production method from the sector of Rapid Prototyping, in which a workpiece is constructed layer by layer from a material, in particular from a plastic, particularly preferably from a filament.

Furthermore, in this connection a "printing head unit" should be understood to be, in particular, a preferably movable unit of the 3D printing device, by way of which printing material is directly applied to a printed surface in one operation. Preferably, the printing head unit has at least one nozzle by way of which a printing material is dispensed, in particular extruded. In this connection, a "feed device" should be understood to be, in particular, a device that is provided for feeding a printing material to the printing head unit during operation. Preferably, the feed device is provided for making a printing material available at the printing head unit. Preferably, this should be understood to mean, in particular, a device that is provided for transporting a printing material from a storage unit to the printing head unit. In this regard, transport takes place, in particular, in a defined amount and/or at a defined advancing speed. The term "provided" should be understood to mean, in particular, specially programmed, designed and/or equipped. The statement that an object is provided for the purpose of a specific function should be understood to mean, in particular, that the object fulfills and/or performs this specific function in at least one application state and/or operating state. In this connection, a "high-performance plastic" should be understood to mean, in particular, a plastic, preferably a thermoplastic, which has a shape retention under heat of more than 150° C. Different high-performance plastics that appear practical to a person skilled in the art are conceivable, such as polyaryls, polyarylates, polyaramids, heterocyclic polymers, liquid-crystal polymers and/or polyaryletherketones, for example. Furthermore, the term "PAEK" should be understood to mean, in particular, the group of polyaryletherketones, which includes PEEK, PEK, PEKEKK, and PEKK, for example.

By means of the embodiment of the 3D printing device according to the invention, a printing device can be made available, in particular, by means of which at least high-performance plastics, in particular high-performance thermoplastics can be processed. In this way, the result can be achieved, in particular, that even technical components as well as components that are exposed to great thermal stress can be produced by means of a 3D printing device.

Furthermore, it is proposed that the 3D printing device is configured as a 3D dental printing device. Preferably, the 3D printing device can be used for production of dental objects, in particular for production of dental implants, temporary appliances, inlays and/or tooth replacements. In this connection, the term "3D dental printing device" should be understood to mean, in particular, a 3D printing device that is provided for production of elements in the dental sector, in particular of dental objects such as semifinished products, intermediate products and/or end products, for example. In this way, an advantageous embodiment of the 3D printing device can be made available. Fundamentally, however, other applications of the 3D printing device that appear practical to a person skilled in the art are also conceivable. In particular, the result can be achieved, in this way, that dental objects, in particular individual dental objects, can be advantageously produced in rapid and simple manner.

Furthermore, in this regard it would also be conceivable that the 3D printing device for production of dental objects, in particular for production of dental implants, temporary appliances, inlays and/or tooth replacements, is provided for applying a printing material to an individual three-dimensionally shaped printing surface. Preferably, in this regard the printed surface is formed by a dental positive impression model. In this way, a dental object, in particular, can be printed directly onto an image of a patient's set of teeth. In this way, the use of support material, in particular, can be avoided. Furthermore, in this way printing can be implemented in advantageously rapid manner, in particular. A corresponding possible implementation can be derived from the German Offenlegungsschrift [unexamined patent document published for public scrutiny] DE 10 2013 111 387 A1.

It is furthermore proposed that the 3D printing device has a basic unit having at least one printing baseplate that can be heated, in particular heated in regulated manner, onto which printing takes place during a printing process. Preferably, the printing baseplate can be heated in segments, in regulated manner. Preferably, the segments of the printing baseplate are configured so as to be controlled separately. Particularly preferably, the segments of the printing baseplate can be controlled separately by way of a control and/or regulation unit. Preferably, the printing baseplate can thereby be heated at different intensity by way of the control and/or regulation unit. In this way, targeted heating, in particular, can be achieved. Furthermore, in this way an advantageously efficient printing baseplate can be achieved. In this connection, the term "printing baseplate" should be understood to mean, in particular, an element or a unit that forms a substratum, at least in part, for printing. Preferably, it should understood to mean, in particular, an element or a unit on which an object to be printed is built up. Preferably, a first layer of a printed object is built up directly on the printing baseplate. Preferably, the printing baseplate is formed by a rectangular, in particular a flat plate, onto which printing takes place during printing. Fundamentally, however, a non-flat shape, such as a curved shape of the plate, for example, would also be conceivable. Preferably, a temperature of the printing baseplate can at least be controlled, particularly preferably regulated. In this way, an object to be printed can advantageously be heated from the direction of a base. In this way, overly rapid cooling of an object to be printed can be prevented.

Furthermore, it is proposed that the 3D printing device has at least one surface heating unit disposed opposite the printing baseplate, which unit is provided for heating a printed object disposed on the printing baseplate, at least in part, from a direction that differs from the printing baseplate. Preferably, the surface heating unit is provided for heating a printed object from one side and/or particularly preferably from above, at least in part. In this connection, the statement that "the surface heating unit is disposed opposite the printing baseplate" should be understood to mean, in particular, that the printing region in which a printed object is built up during operation of the 3D printing device is disposed, at least in part, between the printing baseplate and the surface heating unit. Preferably, it should be understood to mean, in particular, that the surface heating unit is disposed, at least in part, in a region that extends upward perpendicular to a printing surface of the printing baseplate. Furthermore, in this connection a "surface heating unit" should be understood to mean, in particular, a unit that is provided, at least in part, for production of heating power over a planar region. Preferably, a heating power is generated on a surface area of at least 10 cm$^2$, preferably of at least 50 cm$^2$, and particularly preferably of at least 100 cm$^2$. Preferably, this should be understood to mean a unit that is provided for production of planar heat radiation. Particularly preferably, in this regard heat radiation is oriented, at least essentially, perpendicular to a surface of the surface heating unit. Fundamentally, however, other embodiments of the surface heating unit that appear practical to a person skilled in the art are also conceivable. Fundamentally, it would also be conceivable that the surface heating unit is configured as a microwave heating unit, which is provided for targeted emission of microwaves for partial heating of the printed object. The statement that "the surface heating unit is provided for heating a printed object partially" should be understood, in this connection, in particular, to mean that the surface heating unit is provided for heating at least partial regions of a part of the printed object that has already been printed. Preferably, the surface heating unit is provided for heating a partial region of the printed object in targeted manner, as compared with a different partial region. In this regard, however, "heating" can also be understood to mean merely maintaining a temperature of the partial region and/or preventing a rapid drop of a temperature of the partial region. In this way, a temperature of the printed object can be influenced in targeted manner. Preferably, in this way a temperature of the printed object can be advantageously adapted to a printing process. In particular, in this way the temperature of individual partial regions of the printed object can be controlled in targeted manner. In particular, in this way an advantageously uniform heat distribution of the printed object can be achieved, even in a printing chamber. Preferably, in this way, temperature differences that lead to deformation of the printed object can be prevented from occurring. Furthermore, macroscopic deformations of the printed object can be suppressed in that a solidification process is controlled in targeted manner. Furthermore, a homogeneous color of the printed object, in particular similar to a starting color of the printing material can be achieved. In particular, advantageous mechanical properties of the printed object can be achieved.

Furthermore, it is proposed that the at least one printing baseplate and the at least one surface heating unit are configured to move relative to one another. Preferably, the surface heating unit is configured to be movable relative to the printing baseplate. Particularly preferably, the surface heating unit is configured to be movable relative to the printing baseplate, and the printing baseplate is configured to be movable relative to the surface heating unit. Preferably, the surface heating unit is disposed in a fixed position relative to the printing head unit. It would also be conceivable, however, that the surface heating unit is configured to be movable independent of the printing head unit. Particularly preferably, however, the surface heating unit is firmly connected with the printing head unit. In this way, heating of the printed object can take place by means of the surface heating unit, in particular independent of a position of the printing baseplate. In the case of a fixed-position arrangement of the surface heating unit relative to the printing head unit, it can be prevented, in particular, that a movement of the printing head unit has a negative influence on a heating effect of the surface heating unit, in particular by means of covering it. In particular, an advantageous planar surface heating unit can be implemented in this way.

Furthermore, it is proposed that the feed device is provided for feeding the printing material to the printing head unit in the form of a filament. In this connection, a "filament" should be understood, in particular, to be a material that is present in the form of a thread and/or rod. Preferably, it should be understood to be, in particular, a material, in particular a plastic, which is present in a form similar to a thread, and therefore, in particular, has a transverse expanse that is many times less than a longitudinal expanse along a center fiber. Preferably, a transverse expanse amounts to less than 1.5 cm, preferably less than 1 cm, and particularly preferably less than 0.5 cm. Preferably, the filament has an at least approximately round cross-section. Particularly preferably, the filament is preset in a form that is wound onto a spool. In this regard, "many times less" should be understood to mean, in particular, at least 10 times, preferably at least 50 times, and particularly preferably at least 100 times less. Fundamentally, however, it must be taken into consideration that a longitudinal expanse of the filament preferably decreases along the center fiber during operation of the 3D printing device, so that a ratio of the transverse expanse to a longitudinal expanse relates to an original state. In this way, in particular, particularly advantageous feed can be achieved. Preferably, in this way a feed amount and/or a feed speed can be controlled in advantageous manner, in terms of a simple design. Furthermore, in this way, melting of the printing material can be achieved in advantageously rapid manner.

It is furthermore proposed that the feed device has at least one transport element that is provided for movement of the printing material at a defined advancing speed, in at least one operating state. Preferably, the transport element is configured as a transport roller, at least in part. Particularly preferably, a feed amount of printing material can be adjusted by way of the advancing speed of the feed device. In this connection, a "transport element" should be understood to mean, in particular, an element of the feed device that is provided for direct transport of the printing material. Preferably, it should be understood to be an element that is provided for making available an advancing movement of the printing material in the direction of the printing head unit. Particularly preferably, the transport element is provided for pulling the printing material, in particular in the form of a filament, from a storage unit, in particular a coil, and conveying it to the printing head unit. Preferably, the transport element is provided for making a printing material available at the printing head unit. In this way, feed of printing material can be reliably guaranteed. Furthermore, in this way, in particular, an amount of the supplied printing material can be influenced. A reliable printing process can be guaranteed.

Furthermore, it is proposed that the basic unit has at least one cooling device, which is provided for active cooling of the printing baseplate. Preferably, the cooling device is provided for shock-like cooling of the printing baseplate. Preferably, a cooling progression of the printing baseplate can at least be influenced, particularly preferably controlled by way of the cooling device. In this connection, a "cooling device" should be understood, in particular, to be a device that is provided for active cooling of the printing baseplate. Preferably, it should be understood to be a device that is provided for active lowering of a temperature of the printing baseplate, in particular after deactivation of a heating system of the printing baseplate. In this regard, cooling, in particular, goes beyond pure emission of heat to the surroundings. In this regard, various methods for cooling that appear practical to a person skilled in the art are conceivable, such as, in particular, liquid cooling, such as water cooling or oil cooling, for example, and/or gas cooling, such as air cooling or carbon cooling, for example. In this way, rapid cooling of the printing baseplate can advantageously be achieved. In particular, in this way a cooling progression of the cooling device can be actively influenced, in particular controlled. In this way, release of a printed object, for example, can be achieved, in particular. Furthermore, in this way "warping" of the printed object due to incorrect cooling can be prevented. A cooling progression can be advantageously adapted to a printed object. In this regard, "warping" should be understood, in particular, to mean distortion of the printed object after printing. Warping occurs, in particular, on the basis of non-uniformly distributed inherent tensions in the filament as the result of different cooling speeds and temperatures of the individual layers. In particular, warping is caused by shrinkage of the plastic during the cooling process.

It is furthermore proposed that the at least one surface heating unit has multiple heating elements, which are configured so that they can be controlled separately from one another. Preferably, the heating elements are configured so that they can be controlled separately by a control and/or regulation unit. Preferably, the heating elements of the surface heating unit are disposed, at least in part, in a plane, preferably in a plane parallel to the printing baseplate. In this connection, a "heating element" should be understood, in particular, to be an element of the surface heating unit, which is provided for direct generation of a heating power. Preferably, it should be understood, in particular, to be an element of the surface heating unit, which is provided for direct generation of heat radiation. Preferably, the heating elements form segments of the surface heating unit. Particularly preferably, the heating elements are configured to be electrically separated from one another, at least in part. Preferably, each of the heating elements has a separate heating means. Fundamentally, however, it would also be conceivable that the heating elements are controlled, separately from one another, by means of targeted control of the entire surface heating unit. In this way, the surface heating unit can advantageously be used in variable manner. In particular, in this way very precise heating of the printed object can be achieved. Furthermore, in this way an advantageously efficient surface heating unit can also be made available. In particular, in the event of a movement of the surface heating unit relative to the printing baseplate, targeted heating of the printed object can nevertheless be achieved. Undesirable heating of surroundings can be prevented.

It is furthermore proposed that the 3D printing device has at least one local heating unit, which is provided, in an operating state, for partially heating a printed object before imprinting of a further layer by means of the printing head unit. Preferably, the local heating unit is provided, in an operating state, to partially heat an uppermost printing layer of the printed object before imprinting of a further layer by means of the printing head unit, in order to improve the adhesion between the individual printing layers. In this regard, it would furthermore be conceivable, in particular, that heating by means of the local unit is partially refrained from, in targeted manner, in order to prevent adhesion, in targeted manner. In this way, the result could be achieved, in particular, that layers can be printed directly one on top of the other, without the layers melting into one another or having melted into one another. In this connection, a "local heating unit" should particularly be understood to be a unit that is provided, at least in part, for point-type production of heating power, wherein point-type should be understood, in particular, to refer to a surface area of less than 10 cm$^2$, preferably of less than 5 cm$^2$, and particularly preferably of less than 1 cm$^2$. Preferably, this should be understood to be a unit that is provided for generation of point-type heat radiation. Particularly preferably, in this regard, heat radiation is oriented, at least essentially, in a defined direction. Fundamentally, it would also be conceivable that the local heating unit is configured as a local microwave heating unit, which is provided for targeted emission of microwaves for partial heating of the printed object. In this way, very precise heating of the printed object can be achieved. Furthermore, in this way an advantageously efficient heating unit can also be made available. In particular, the printed object can advantageously be heated partially in this way. Furthermore, in this way a connection of the layers can be achieved in advantageously reliable manner. In particular, due to the high melting temperatures of high-performance plastics, a very high temperature of the uppermost layer must be made available in order to guarantee that the layers melt together.

Preferably, it is proposed that the at least one local heating unit is disposed on the printing head unit. Particularly preferably, the local heating unit is disposed so as to rotate about the printing head unit. By means of placement of the local heating unit on the printing head unit, it can be made possible, in particular, that the local heating unit precedes the printing head unit. By means of this leading, the result can be achieved, in turn, that an uppermost layer of the printed object is heated, particularly preferably partially melted, directly before application of a further layer. In particular, in this way a temperature of the layer can be set in very precise manner. If the local heating unit is disposed so as to rotate about the printing head unit, a position of the local heating unit can advantageously be adapted to a printing direction. In this way, the result can be achieved, in particularly reliable manner, that the local heating unit precedes the printing head unit. Furthermore, in this way the result can be achieved, in particular, that the local unit can be rotated above an uppermost layer, in order to achieve targeted heating. The local heating unit can fundamentally be used both with the surface heating unit and also without the surface heating unit.

Furthermore, it is proposed that the printing head unit has at least one nozzle. Preferably, the nozzle has a hardness of at least 200 HV 10, preferentially of at least 600 HV 10, preferably of at least 1200 HV 10, and particularly preferably of at least 2000 HV 10 on an inner side, at least in part. Preferably, the nozzle of the printing bead unit has a coating having a hardness of at least 200 HV 10, preferentially of at least 600 HV 10, preferably of at least 1200 HV 10, and particularly preferably of at least 2000 HV 10 on an inner side. Particularly preferably, the at least one nozzle of the printing head unit has a coating that consists, at least in part, of a ceramic, such as tungsten carbide, for example, on an inner side. Fundamentally, however, other materials that appear practical to a person skilled in the art are also conceivable. Below a hardness of at least 200 HV 10 should be understood, in this connection, in particular, to mean that a hardness value of an inner side of the nozzle amounts to at least 200, wherein the hardness test according to Vickers is to be carried out with a test force of 10 kp, therefore of approximately 98.07 N. In this way, in particular, advantageously low wear of the printing head unit, in particular of the nozzle of the printing head unit can be achieved. Preferably, in this way the result can be achieved, in particular, that a size and/or a shape of the outlet opening of the nozzle of the printing head unit remains at least essentially constant over the duration of an operation. In particular, when using additives in a printing material, such as fibers, for example, in particular carbon fibers, an advantageously long useful lifetime of the printing head unit can be achieved.

Furthermore, it is proposed that the 3D printing device has an active cooling unit, which is provided for active cooling of at least one temperature-critical component. Preferably, the active cooling unit is configured as an active water cooling unit. Preferably, the active cooling unit is provided for cooling temperature-critical components that are situated in the surroundings, in particular in the direct surroundings of the printing head unit. In this connection, an "active cooling unit" should be understood to mean, in particular, a unit that is provided for active cooling of at least one component. Preferably, it should be understood to mean a unit that is provided for actively carrying heat away from the component to be cooled. Particularly preferably, the unit is provided for actively lowering a temperature of a component. In this regard, cooling goes beyond, in particular, pure emission of heat to the surroundings. In this regard, different methods for cooling that appear practical to a person skilled in the art are conceivable, such as, in particular, liquid cooling, such as water cooling or oil cooling, for example, and/or gas cooling, such as air cooling or carbon cooling, for example. In this way, overly great heating of temperature-critical components can be advantageously prevented. In particular, in this way, it can be prevented that components are damaged due to the high temperatures and/or that a precision of the 3D printing device is impaired due to heat expansions.

It is furthermore proposed that the active cooling unit is provided for actively cooling at least one sensor unit disposed on the printing head unit. Preferably, the active cooling unit is provided for cooling a measurement sensor disposed on the printing head unit. Preferably, the active cooling unit is provided for cooling a sensor unit disposed on the printing head unit, which sensor unit is configured as a calibration sensor. Particularly preferably, the calibration sensor is provided for calibration. For this purpose, the calibration sensor is provided, in particular, for measuring the printing baseplate and/or a printed object, because in order to guarantee good printing quality, levelness of the printing bed, in particular of the printing baseplate must be guaranteed. In this connection, a "sensor unit" should be understood to mean, in particular, a unit that is provided for recording at least one parameter and/or one physical property, wherein recording can take place actively, in particular by generation and emission of an electrical measurement signal, and/or passively, in particular by means of recording of property changes of a sensor component. Various sensor units that appear practical to a person skilled in the art are conceivable. In this way, the result can be advantageously achieved that sensor units, in particular a temperature-critical sensor unit, can be advantageously positioned on the printing head unit. In this way, advantageous measurement positions, in particular, can be advantageously made available. Furthermore, in this way the result can be achieved that the sensor unit is operated in an optimal temperature range. In this way, an advantageously precise measurement result can be achieved.

Furthermore or alternately, however, it would also be conceivable that the 3D printing device comprises a cooling unit that is provided for making a barrier layer between a warm region and a cold region available, in at least one operating state, for the purpose of generating a defined gas stream between the warm region and the cold region. Preferably, the cooling unit is provided for generating a defined air stream between the warm region and the cold region. Preferably, the cooling unit is provided for thermally insulating a cold region, at least in part, relative to the warm region. In this regard, it would be conceivable, in particular, that temperature-critical components are disposed, at least in part, in a cold region, in order to avoid separate cooling. In this regard, a "warm region" should be understood to be, in particular, a region of the 3D printing device around the printed object. Preferably, it should be understood, in particular, to be a region of the 3D printing device in which a high temperature is required. Particularly preferably, it should be understood to mean a region between the printing baseplate and the printing head unit and/or the surface heating unit. In this way, in particular, a warm region can be separated from a cold region in targeted manner. In particular, in this way a high heat loss in the warm region can be advantageously prevented.

It is furthermore proposed that the 3D printing device has a sensor unit that is provided for direct measurement of a pressure of the printing material in the at least one printing head unit. Preferably, the sensor unit is provided for direct measurement of a relative pressure of the printing material in the at least one printing head unit relative to an ambient pressure. Preferably, the sensor unit is configured as a pressure sensor. In this connection, a "pressure" should be understood to be a physical pressure. Preferably, it should be understood, in particular, to be a value of a force having the amount F, acting perpendicularly on a surface area having the surface area content A, wherein the pressure is formed by the quotient. Furthermore, in this connection a "pressure sensor" should be understood, in particular, to be a sensor unit that is provided for recording at least one parameter of a physical pressure, wherein recording can take place actively, in particular by generation and emission of an electrical measurement signal, and/or passively, in particular by recording of property changes of a sensor component. In this regard, different technical embodiments such as a passive pressure sensor, relative pressure sensor, absolute pressure sensor and/or difference pressure sensor, for example, are conceivable. Furthermore, different pressure sensors that appear practical to a person skilled in the art are conceivable, such as, for example, piezoresistive pressure sensors and/or piezoelectric pressure sensors. In this way, a pressure in the printing head unit can be advantageously recorded. Preferably, in this way a pressure of a printing material can be recorded. Preferably, in this way a printing process can be advantageously adapted as a function of a pressure of the printing material. Furthermore, in this way a pressure can also be advantageously adapted, controlled and/or regulated.

Furthermore, it is proposed that the sensor unit has at least one sensor element that is disposed on a nozzle of the printing head unit. Preferably, a measurement means of the sensor unit is disposed in the nozzle of the printing head unit. In this way, a pressure of the printing material can advantageously be measured directly in the nozzle. In this way, in particular, a particularly reliable measurement result can be achieved. In particular, an improved measurement result as compared with calculation of the pressure can be achieved.

Furthermore, it is proposed that the 3D printing device has a control and/or regulation unit that is provided for control and/or regulation of at least one pressure parameter. Preferably, the control and/or regulation unit is provided for control and/or regulation of at least one pressure parameter in real time. The control and/or regulation unit serves, in particular for optimal adaptation of pressure parameters to a printing process. For this purpose, the control and/or regulation unit is provided, in particular, for calculation of an equation regarding process quality. Preferably, the control and/or regulation unit is provided for adapting a printing speed, a temperature of the printing head unit, a temperature of the printing baseplate, a temperature of the printed object or its surroundings and/or a pressure of the printing material in the nozzle, as a function of a desired quality of the printed object and/or a desired printing speed. In order to develop a process control tool for the 3D printing device, in this regard, in particular, a numerical approach is proposed, which takes into consideration the relationships between the printing process itself and the material properties of the printing material. In this regard, these relationships are preferably described with equations that represent how the parameters influence the material properties of the printed printing material. The equations are subsequently preferably unified as a single equation, using multiple regression processes. In this way, process control as well as quality assurance can be achieved by way of this equation. The term "control and/or regulation unit" should be understood, in particular, to mean a unit having at least one control electronics system. A "control electronics system" should be understood, in particular, to be a unit having a processor unit and having a memory unit, as well as an operating program stored in the memory unit. In this way, in particular, advantageous control and/or regulation of at least one pressure parameter can be achieved. Preferably, in this way, in particular, monitoring of the printing process can be achieved. In particular, in this way a printing process can be controlled in targeted manner.

Furthermore, it is proposed that the printing head unit has at least one nozzle having at least one structural element that is provided for generating an at least partially turbulent flow in the nozzle. Preferably, the structural element is disposed in an interior of the nozzle. Preferably, the structural element is disposed on an inner side of the nozzle. Particularly preferably, the structural element is formed by a spiral structure that guides the printing material through the nozzle in spiral shape or brings about a spiral-shaped movement of the printing material in the nozzle. In this connection, a "structural element" should be understood, in particular, to be an element that is provided for generation of an at least partially turbulent flow of the printing material in the nozzle. Preferably, the structural element forms at least a macroscopic structure at least on an inner side of the nozzle and/or a surface having an average roughness $R_a$ of at least 10 μm, preferably of at least 100 μm, and particularly preferably of at least 1000 μm. In this regard and in this connection, a "macroscopic structure" should be understood, in particular, to be a structure that projects at least 0.1 mm, preferably at least 0.5 mm, and particularly preferably at least 1 mm into an interior of the nozzle, at least at one point, viewed perpendicular to a main expanse direction of the nozzle, as compared with a base shape, in particular a cylindrical basic shape of an inner side of the nozzle. In this way, in particular, a turbulent flow of the printing material in the nozzle can be achieved. In this way, in turn, clogging of the nozzle can be prevented. In particular when using additives in a printing material, such as fibers, for example, in particular carbon fibers, clogging of the nozzle by the fibers can be advantageously prevented. The problem with fibers is that they generally block an outlet opening of the nozzle, since the nozzles are not intended for transport of solid fibers. In this regard, blockage takes place due to the flow behavior of the melt with the randomly oriented solid fibers. By means of a turbulent flow within the nozzle, a flow is generated such that the fibers are oriented along the flow path. In this manner, the fibers get through the outlet opening of the nozzle without clogging it.

Furthermore, it is proposed that the printing head unit has at least one nozzle switching unit having at least two nozzles, which unit is provided for a disassembly-free switch between the at least two nozzles. Preferably, the nozzle switching unit is configured as a nozzle turret. Particularly preferably, in this regard, the nozzles have different diameters and/or shapes of outlet openings. In this connection, the term "nozzle switching unit" should be understood, in particular, to be a unit of the printing head unit that has multiple nozzles, between which a switch can take place in disassembly-free manner. Preferably, a switch can be made between different nozzles for use. In this regard, the nozzles are constantly disposed, in particular, on the printing head unit, and are merely switched through, depending on which nozzle is supposed to be used currently. In this regard, a decision as to what nozzle is supposed to be used can fundamentally be made by an operator and/or a control and/or regulation unit. If a corresponding decision is made by the control and/or regulation unit, a nozzle can be selected, for example, as a function of a current printed object. Various mechanisms that appear practical to a person skilled in the art for implementation of a nozzle switching unit are conceivable; in particular, however, the nozzle switching unit is configured as a nozzle turret. In this regard, a nozzle turret is configured in accordance with a lens turret in microscopes. In this way, a nozzle switch can advantageously be achieved without having to remove a current nozzle and to install a new nozzle. Preferably, in this way the result can advantageously be achieved in that a nozzle is selected automatically, as a function of a current printed object.

Furthermore, it is proposed that the printing head unit has at least one basic body and at least one nozzle, which is configured to be removable from the basic body. Preferably, the nozzle can be independently removed from the basic body of the printing head unit. In this connection, a "basic body" of the printing head unit should be understood to mean, in particular, a component of the printing head unit, which component accommodates at least a significant part of the components of the printing head unit and/or on which at least a significant part of the components of the printing head unit is attached. Preferably, the basic body forms a housing of the printing head unit, at least in part. In this regard, an "at least significant part" should be understood to be, in particular, at least 50%, preferably at least 60%, and particularly preferably at least 80% of the components of the printing head unit. In this connection, the statement that "the nozzle is configured so that it can be independently removed from the basic body" should be understood to mean, in particular, that the nozzle can be removed without having to remove the entire basic body or preferably at least individual parts of the basic body of the printing head unit. In this way, simple replacement of the nozzle can advantageously be achieved.

It is furthermore proposed that the printing head unit has at least one basic body and at least one Hot End, which is configured so that it can be removed from the basic body, in particular in tool-free manner. In this connection, a "Hot End" should be understood to mean, in particular, a component of the printing head unit, which is heated directly to melt the printing material and/or for direct melting of the printing material. Preferably, this should be understood to mean, in particular, a heatable nozzle of the printing head unit. Furthermore, in this connection, "in tool-free manner" should be understood to mean, in particular, without additional aids, in particular without an additional tool, such as, for example, a screwdriver or the like. In this way, in particular, rapid replacement of a Hot End of the printing head unit can be achieved. In particular, in the case of great wear and/or rapid contamination of the Hot End, a waiting time can advantageously be kept low.

It is furthermore proposed that the 3D printing device has a drying unit that is provided for drying a printing material before it is fed to the printing head unit. Preferably, the drying unit is disposed ahead of the printing head unit, considered along the printing material. In this regard, the drying unit is completely integrated into the 3D printing device. In this connection, the term "drying unit" should be understood, in particular, to mean a unit that is provided for drying of the printing material. Preferably, the drying unit is provided for extracting at least a significant part of any water contained in it. Drying of the printing material by means of the drying unit preferably takes place by means of heat. Fundamentally, however, a different method for drying the printing material, which appears practical to a person skilled in the art, would also be conceivable. In this way, a uniform dryness of the printing material can be advantageously guaranteed. In this way, in turn, a printing process can advantageously be precisely controlled and monitored. Furthermore, a printability of the printing material can be improved by means of this drying.

Furthermore, it is proposed that the 3D printing device has a magazine for holding different printing material. Preferably, different printing materials are accommodated in the magazine, wherein a switch between the different printing materials can be made by way of the magazine. Preferably, the magazine has multiple holders for filament spools and/or multiple containers for different printing materials. Particularly preferably, the 3D printing device uses different printing materials, in particular under control by the control and/or regulation unit, as a function of the color and/or strength of the printed object that is/are supposed to be achieved when it is printed. In particular, an automatic switch can be made between the printing materials, by way of the magazine. Fundamentally, in this regard, it is provided, in particular, that only one printing material is used per printed object. Fundamentally, however, it would also be conceivable that printing materials are changed and/or mixed during printing of a printed object. The printing materials differ, in particular, in terms of their color. In this way, printed objects can automatically be produced, in particular, from different printing materials. In this way, different colors of printed objects, in particular, can be implemented using the 3D printing device.

Furthermore, the invention proceeds from a printing material for the 3D printing device. It is proposed that the 3D printing device has at least one component that consists of PAEK, and at least one further component that consists of a material that differs from PAEK. Preferably, at least one component consists of PEKK and/or PEEK, and at least one component consists of a material that differs from PEKK and/or PEEK, preferably of a material that differs from PEAK. In this way, a printing material can be advantageously adapted to individual requirements.

Furthermore, the invention proceeds from a method for operation of the 3D printing device, having a printing material that is formed, at least in part, by a high-performance plastic. It is proposed that a printing process is controlled and/or regulated by a control and/or regulation unit of the 3D printing device. In this way, in particular, advantageous control and/or regulation of at least one printing parameter can be achieved. Preferably, in this way, in particular, monitoring of the printing process can be achieved. In particular, in this way a printing process can be controlled in targeted manner.

It is furthermore proposed that different heating elements of the surface heating unit are controlled as a function of at least one parameter. Preferably, the heating elements of the surface heating unit are controlled as a function of at least one parameter of the printed object and/or at least one parameter of the printing process. Particularly preferably, the heating elements of the surface heating unit are controlled as a function of a shape and/or composition of the printed object, the printing progress and/or temperature parameters of a part of the printed object that has already been printed. In this way, the surface heating unit can advantageously be used in variable manner. In particular, in this way very precise heating of the printed object can be achieved. Furthermore, in this way advantageously efficient heating can also be made available. In particular, in the case of a movement of the surface heating unit relative to the printing baseplate, targeted heating of the printed object can nevertheless be achieved. Undesirable heating of the surroundings can be prevented. Preferably, in this way a heating surface of the surface heating unit can be adapted to a shape of the printed object in real time.

It is furthermore proposed that partial regions of the printed object are heated in targeted manner by means of controlling different heating elements of the surface heating unit. In this regard, in particular, partial regions of a part of the printed object that has already been printed are heated. Targeted heating can be used, in this regard, to prevent warping. In this way, very precise heating of the printed object can be achieved. Furthermore, in this way advantageously efficient heating can also be made available. Undesirable heating of the surroundings can be prevented. Furthermore, it can also be prevented that partial regions of the printed object, which are not supposed to be heated at a defined point in time of the printing process, in particular, are heated. Preferably, in this way a heating surface of the surface heating unit can be adapted to a shape of the printed object in real time. Preferably, in this way, in particular, monitoring of the printing process can be achieved. In particular, in this way a printing process can be controlled in targeted manner.

Furthermore, it is proposed that the printed object is partially heated by means of the local heating unit, in preceding manner, before imprinting of a further layer. Preferably, the adhesion between the individual printed layers is improved by means of partial heating, by way of the local heating unit, of an uppermost printed layer of the printed object before another layer is imprinted by the printing head unit. In this regard, it would also be conceivable that heating by means of the local unit is partially refrained from, in targeted manner, in order to prevent adhesion in targeted manner. In this way, the result could be achieved, in particular, that layers can be imprinted one on top of the other directly, without the layers melting into one another. In this way, very precise heating of the printed object can be achieved. Furthermore, in this way an advantageously efficient heating unit can also be made available. In particular, the printed object can advantageously be heated partially in this way. Furthermore, in this way connection of the layers can be achieved in advantageously reliable manner. In particular, due to the high melting temperatures of high-performance plastics, a very high temperature of the uppermost layers must be made available to guarantee that the layers melt together.

Furthermore, it is proposed that a printing speed is adjusted as a function of a pressure of the printing material in the printing head unit. Preferably, a printing speed is controlled and/or regulated as a function of a pressure of the printing material in the printing head unit. Particularly preferably, in this regard, a printing speed is regulated in real time. In this way, a printing speed can advantageously be adapted to a printing process. In particular, in this way variable adjustment of a printing speed can be achieved. Preferably, in this way, in particular, monitoring of the printing process can be achieved. In particular, in this way a printing process can be controlled in targeted manner.

Furthermore, it is proposed that a shrinkage process of the printed object during cooling after a printing procedure is calculated and/or taken into consideration before and/or during the printing procedure. Preferably, a shrinkage behavior of the printing material is calculated and/or taken into consideration before and/or during the printing procedure, in order to achieve maximal printing precision. In this regard, the shrinkage behavior is calculated and/or taken into consideration, in particular, in such a manner that a printed object shrinks to the desired dimensions after shrinkage caused by cooling, and therefore more material is applied during a printing process, in targeted manner, so as to equalize the shrinkage. In this regard, in this connection "shrinkage" should be understood, in particular, to mean an intentional or unintentional change in dimensions of plastics when a temperature change occurs. In this way, in particular, an advantageously great printing precision can be achieved. In particular, in this way an advantageously great precision of a final printed object can be achieved. Preferably, in this way, in particular, monitoring of the printing process can be achieved. In particular, in this way a printing process can be controlled in targeted manner.

It is furthermore proposed that a printed object is measured during the printing procedure, at least in part. Preferably, the printed object is measured during the printing procedure, by means of a camera and/or a calibration sensor. Preferably, the printed object is measured during the printing procedure, at least in part, in order to determine possible deviations between the printed object and a digital pattern stored in the control and/or regulation unit. In this way, the precision of the printing procedure can be monitored in advantageous manner. Preferably, in this way possible deviations between the printed object and a digital pattern stored in the control and/or regulation unit can be determined. Preferably, in this way, in particular, monitoring of the printing process can be achieved. In particular, in this way a printing process can be controlled in targeted manner. Fundamentally, however, it would also be conceivable that measuring of the printed object is carried out only after a printing procedure. In this way, the calculation effort can advantageously be reduced.

It is furthermore proposed that the printing parameters of a printing procedure are adapted, at least in part, as a function of the measurement result. Preferably, the printing parameters of a printing procedure are adapted, at least in part, as a function of a deviation between the printed object and a digital pattern stored in the control and/or regulation unit. In this way, the result can be achieved, in particular, that possible printing imprecisions can be improved, in particular during the printing procedure. Furthermore, it would also be conceivable that the 3D printing device automatically carries out corrections of the printed object as a function of a measurement result. If, in this regard, in particular, as an example, a significant deviation between the printed object and a digital pattern stored in the control and/or regulation unit occurs, corrections can be carried out in targeted manner, in order to correct the deviation. In this way, an advantageously precise 3D printing device can be made available. An advantageously precise printing process can be made possible.

Furthermore, it is proposed that a color of a printed object to be printed is influenced by means of adaptation of at least one printing parameter. Preferably, a color of a printed object to be printed is influenced, in particular, by means of adaptation of a printing temperature and/or a pressure of the printing material in the printing head unit. Particularly preferably, the control and/or regulation unit adapts a printing temperature and/or a pressure of the printing material as a function of a desired color of the printed object. However, other printing parameters that appear practical to a person skilled in the art for adaptation of a color of the printed object to be printed are also conceivable. In this way, adaptation of a color of the printed object can take place, while the printing material remains the same. Preferably, in this way at least nuances of a color can be influenced. Furthermore, color progressions can also be made possible.

Furthermore, it is proposed that a printing material is dried before being fed to the printing head unit. In this regard, drying of the printing material can take place both directly, in the 3D printing device and also in a separate device. Drying of the printing material by means of the drying unit preferably takes place by means of heat. Fundamentally, however, a different method for drying the printing material, which appears practical to a person skilled in the art, would also be conceivable. In this way, a uniform dryness of the printing material can be guaranteed. In this way, in turn, a printing process can be controlled and monitored in advantageously precise manner. Furthermore, by means of drying, the printability of the printing material can be improved. Preferably, in this way, in particular, a high level of monitoring of the printing process can be achieved.

Furthermore, it is proposed that before printing a printed object, a stabilization layer having a base surface is imprinted onto the printing baseplate, which surface is larger than a base surface of a first layer of the printed object. Preferably, the stabilization layer has rounded corners, at least in part. Particularly preferably, the stabilization layer has an at least partially elliptical base surface. In this connection, the term "stabilization layer" should be understood to mean, in particular, a printed layer on which a printed object is imprinted during a printing procedure. In this regard, the layer is preferably connected with the printed object, at least during a printing procedure. Particularly preferably, this should be understood, in particular, to mean a layer that is provided for absorbing tensions in the printed object and passing them away to the outside. The stabilization layer serves, in particular, to prevent warping of the printed object itself, in that tensions that cause warping are conducted away into the stabilization layer. The stabilization layer is preferably removed from the printed object after the printing procedure. In this way, warping of the printed object can reliably be prevented. Furthermore in this way, in particular, a high level of monitoring of the printing process can be achieved.

It is furthermore proposed that the printing baseplate is actively cooled after a printing process, in order to release the printed object. Preferably, the printing baseplate is cooled in shock-like manner after a printing process. In this regard, cooling takes place, in particular, by means of the cooling device. In this way, in particular, reliable release of the printed object can be achieved. In particular, it can be prevented that the printed object must be removed from the printing baseplate manually. Furthermore, in this way automatic release of the printed object, even in the case of great adhesion of the printed object to the printing baseplate during the printing process itself, can be achieved.

The 3D printing device according to the invention, as well as the 3D printer, the printing material, and the method are not supposed to be restricted to the application and embodiment described above, in this regard. In particular, the 3D printing device according to the invention, as well as the 3D printer, the printing material, and the method can have a number of individual elements, components, and units that deviate from the number described herein, in order to fulfill a method of functioning described herein.

DRAWINGS

Further advantages are evident from the following figure description. An exemplary embodiment of the invention is shown in the drawings. The drawings, the description, and the claims contain numerous characteristics in combination. A person skilled in the art will consider the characteristics individually, as well, in practical manner, and bring them together in further practical combinations.

Figure 2:
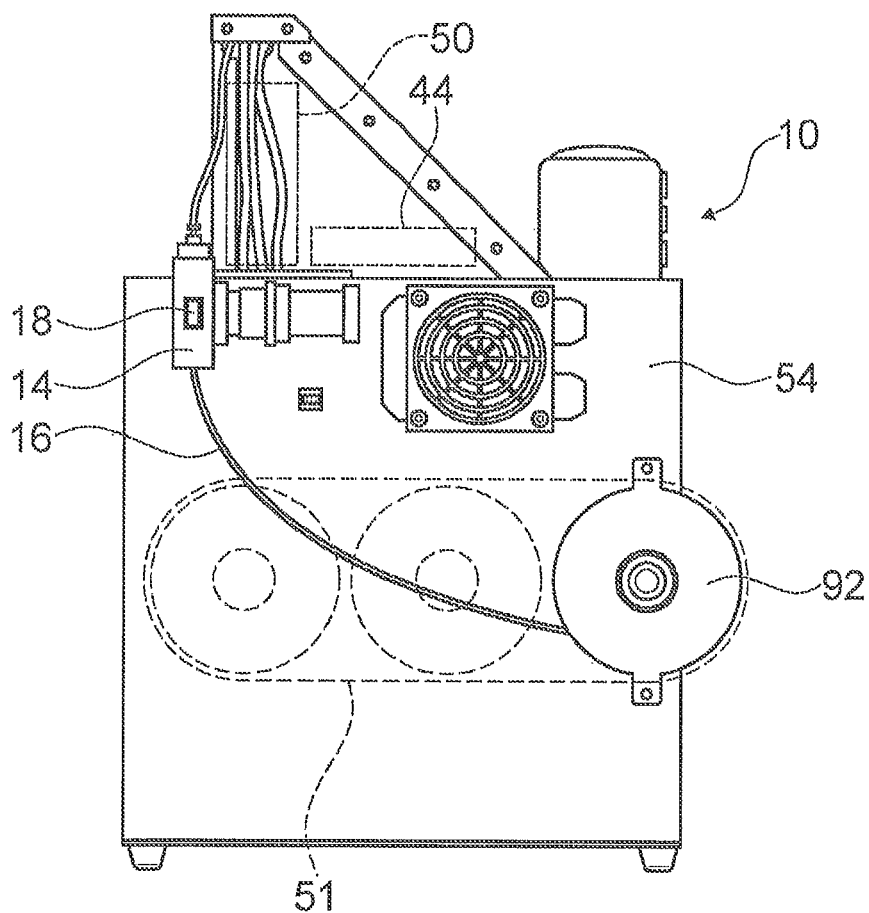
Figure 3:
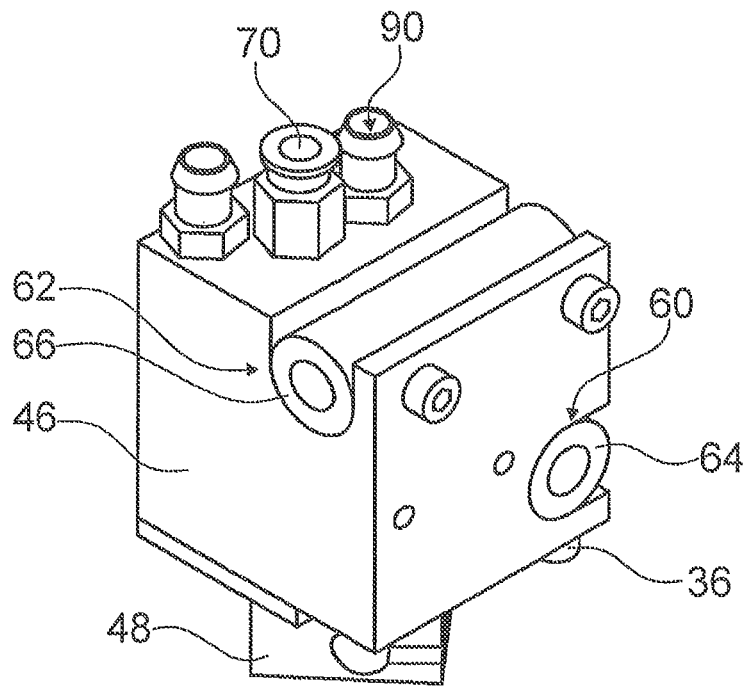
Figure 4A:
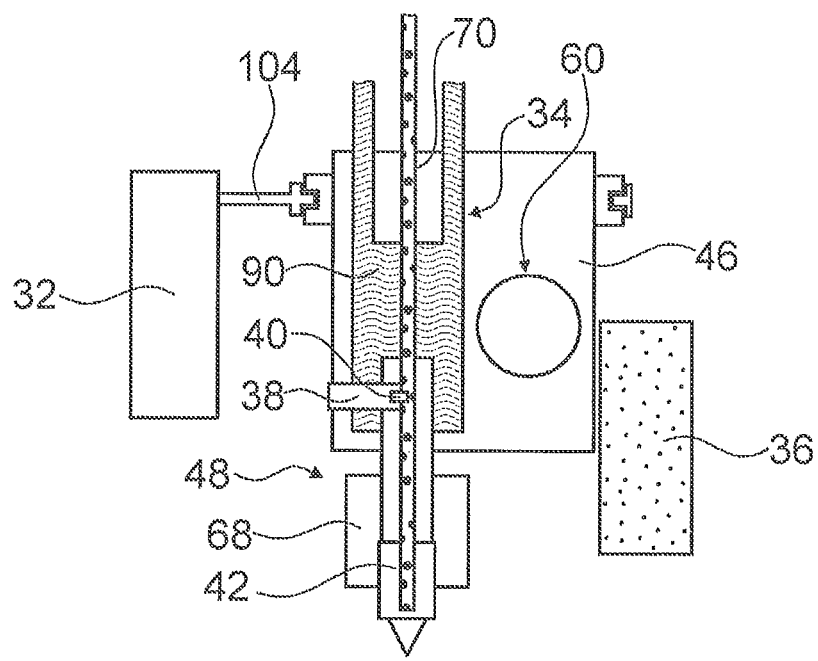
Figure 4B:
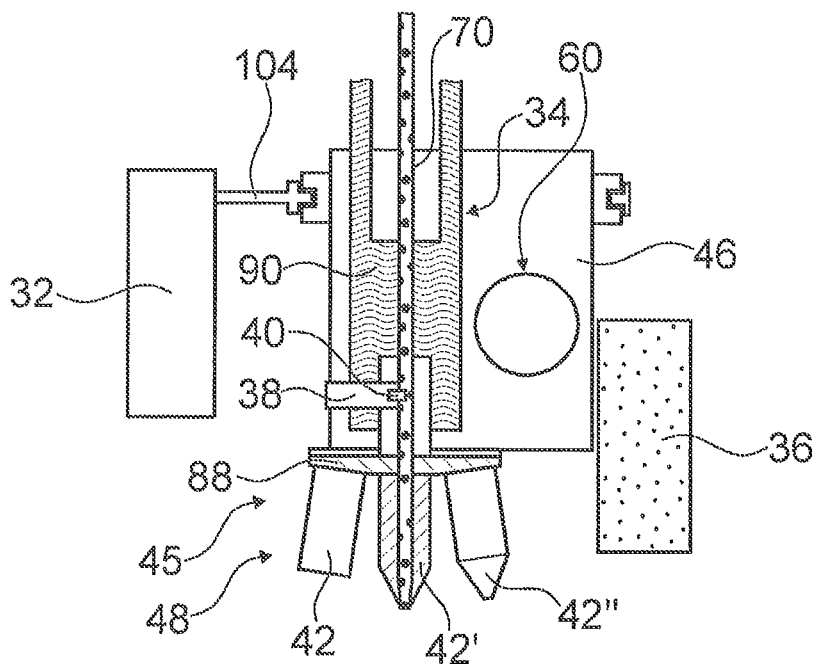
Figure 5A:
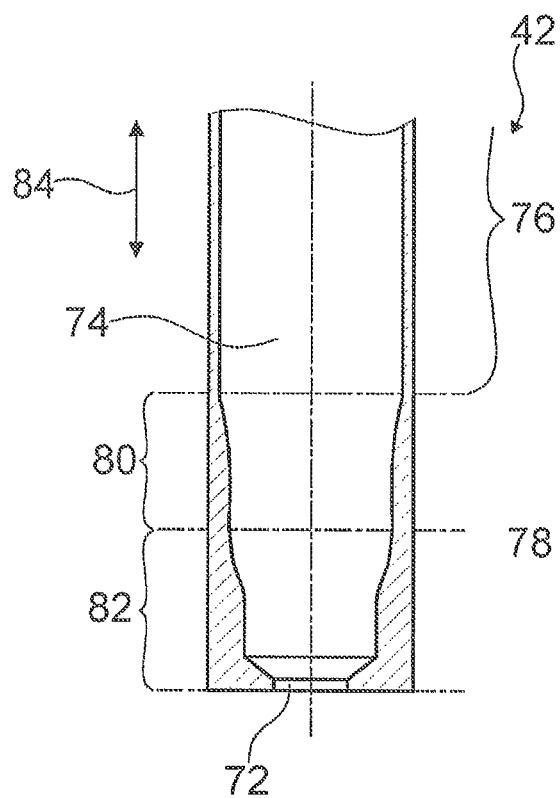
Figure 5B:
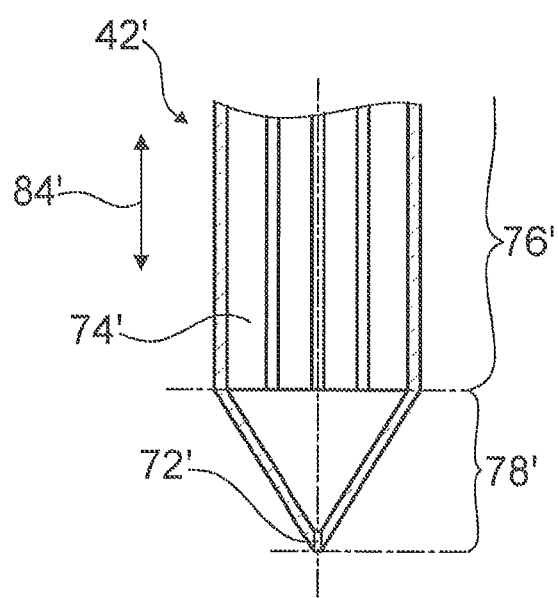
Figure 5C:
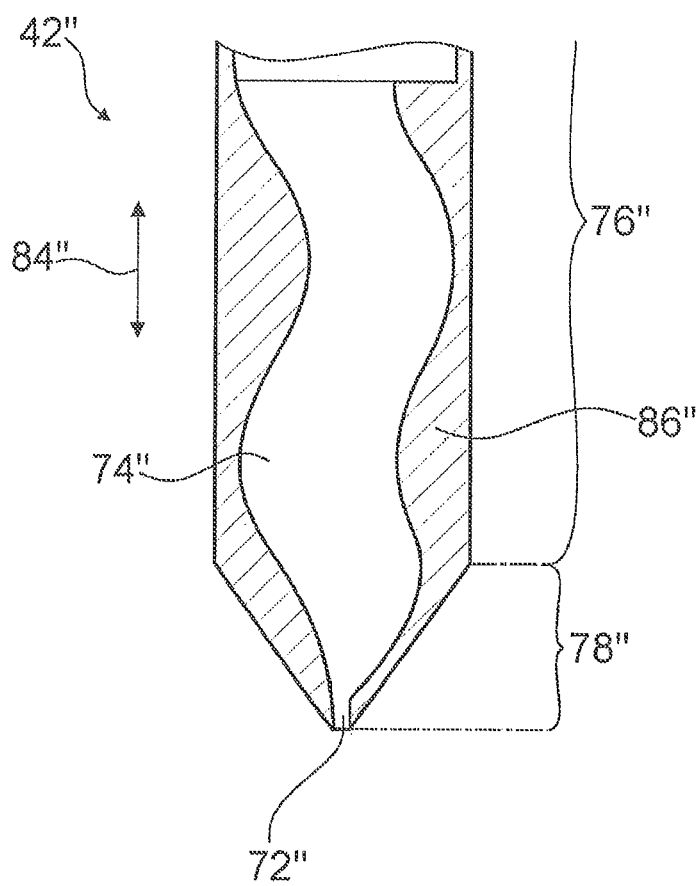
Figure 6A:
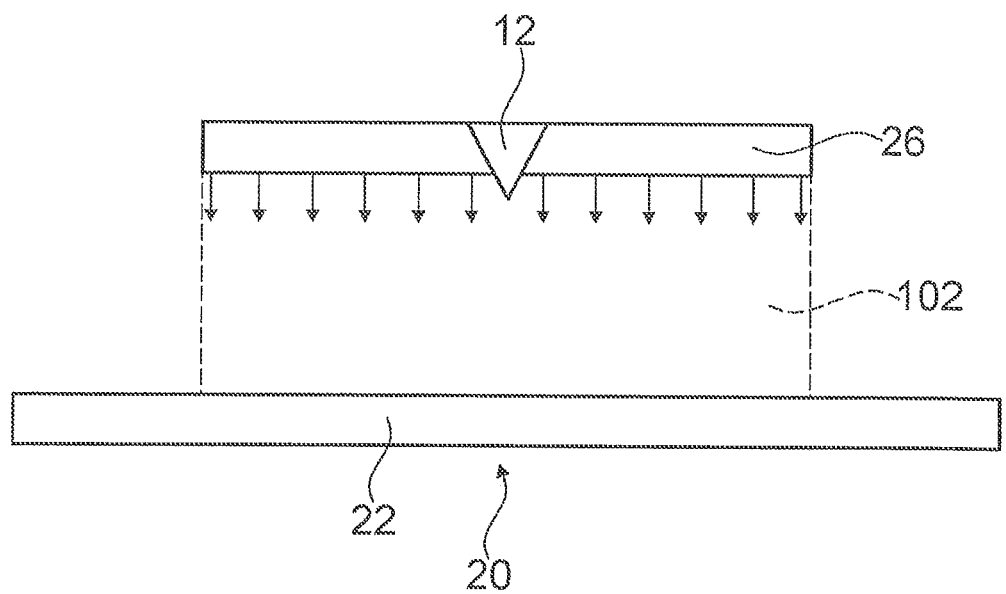
Figure 6B:
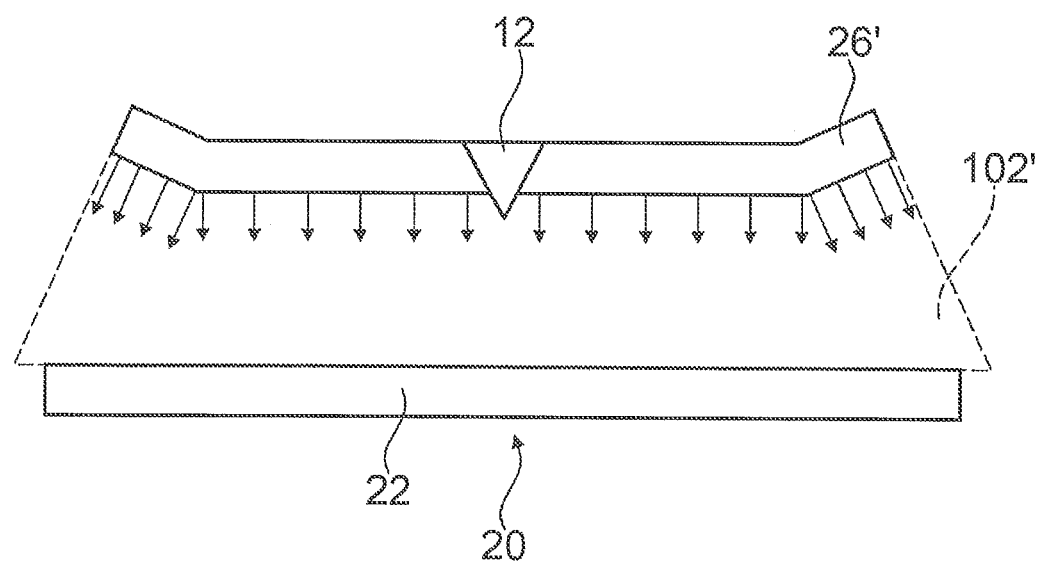
Figure 7:
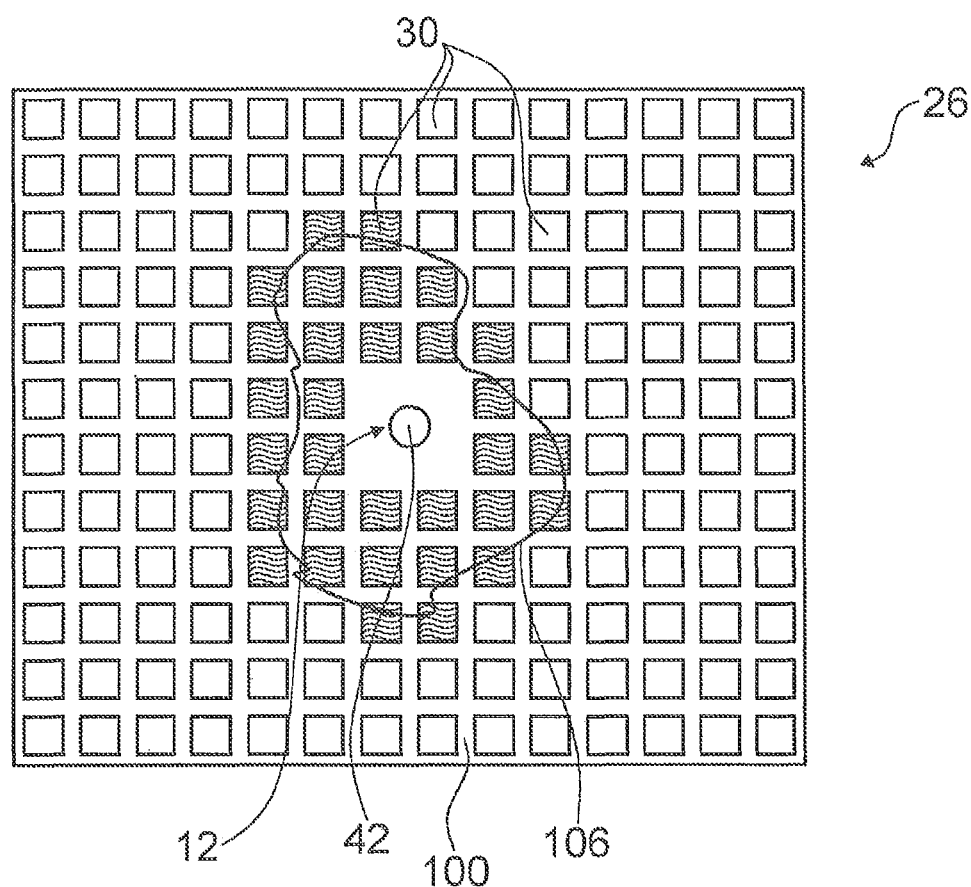
Figure 8A:
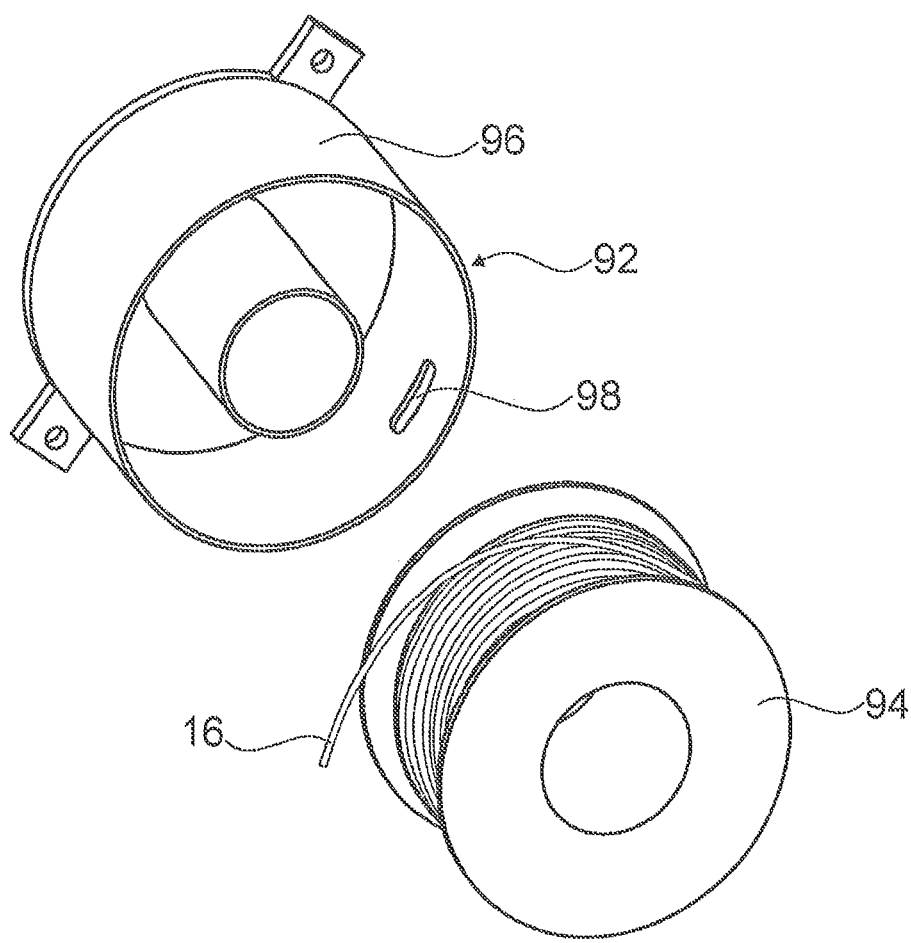
Figure 8B:
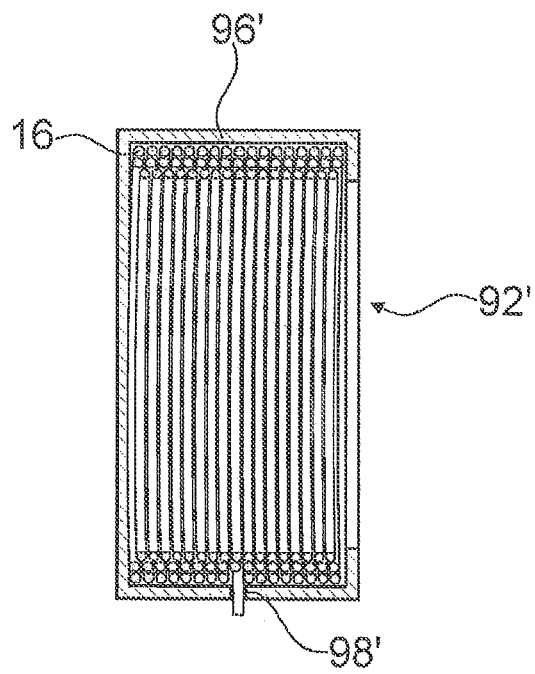
Figure 9:
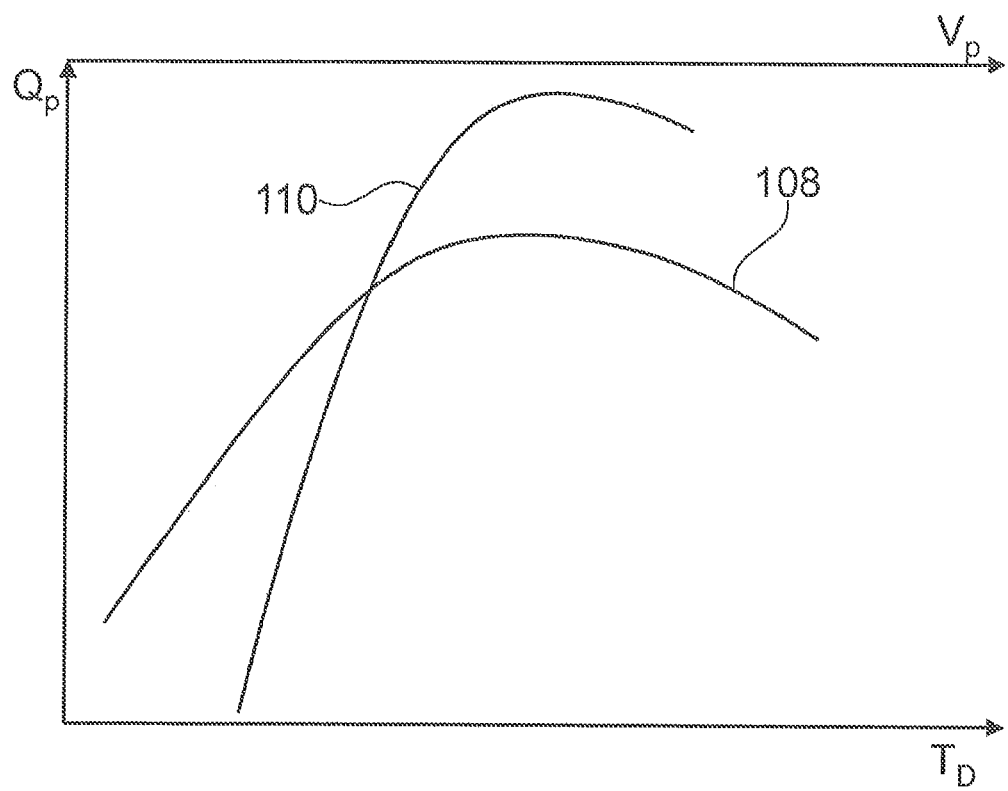
Figure 10:
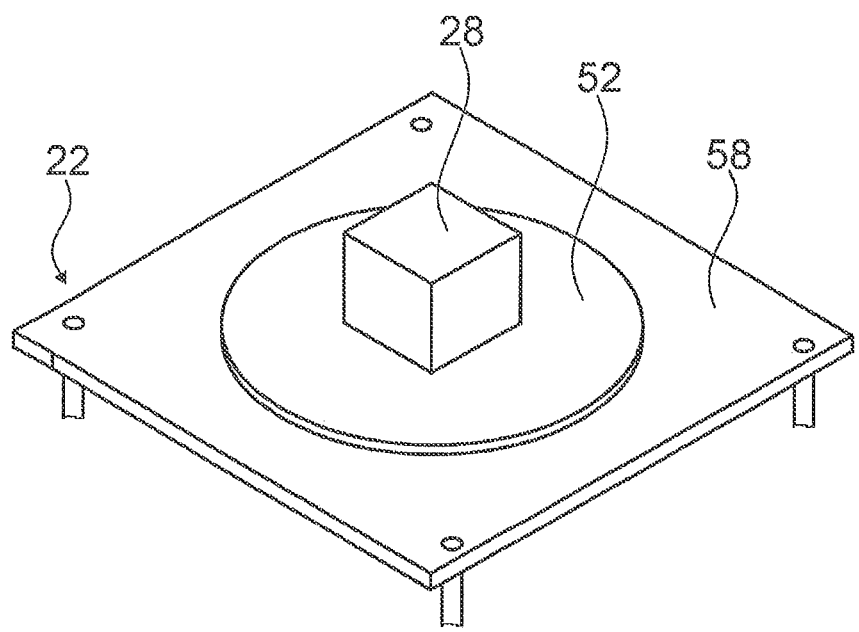

The figures show:

FIG. 1 a 3D printer having a 3D printing device according to the invention, in a schematic representation from the front, FIG. 2 the 3D printer having the 3D printing device according to the invention, in a schematic representation from the rear, FIG. 3 a printing head unit and an active cooling unit of the 3D printing device according to the invention, in a schematic representation, FIG. 4A the printing head unit, the active cooling unit, and a sensor unit of the 3D printing device according to the invention, in a schematic sectional representation, FIG. 4B the printing head unit with a nozzle switching unit, the active cooling unit, and a sensor unit of the 3D printing device according to the invention, in a schematic sectional representation, FIG. 5A a partial detail of a nozzle of the printing head unit of the 3D printing device according to the invention, in a schematic sectional representation, FIG. 5B a partial detail of an alternative nozzle of the printing head unit of the 3D printing device according to the invention, in a schematic sectional representation, FIG. 5C a furtherer alternative nozzle of the printing head unit of the 3D printing device according to the invention a schematic sectional representation, FIG. 6A a basic unit having a printing baseplate, the printing head unit, and a surface heating unit, of the 3D printing device according to the invention, in a schematic representation, FIG. 6B the basic unit with the printing baseplate, the printing head unit, and an alternative surface heating unit, of the 3D printing device according to the invention, in a schematic representation, FIG. 7 the printing head unit and the surface heating unit of the 3D printing device according to the invention, in a schematic representation, in one operating state, FIG. 8A a printing material and a printing material holding unit of the 3D printing device, in a schematic representation, FIG. 8B the printing material and an alternative printing material holding unit of the 3D printing device, in a schematic representation, FIG. 9 a diagram for representing a relationship of printing parameters of the 3D printing device according to the invention, in a schematic representation, and FIG. 10 a partial detail of the basic unit with the printing baseplate, of the 3D printing device according to the invention, and a printed object with a stabilization layer, in a schematic representation.

DESCRIPTION OF THE EXEMPLARY EMBODIMENT

FIGS. 1 and 2 show a 3D printer having a 3D printing device 10. The 3D printing device 10 forms the 3D printer. Fundamentally, however, it would also be conceivable that the 3D printing device 10 is merely configured as a kit that is provided for upgrading an already known 3D printer. Therefore it would fundamentally also be conceivable that parts of the 3D printing device 10 could be associated with the 3D printer.

The 3D printing device 10 is configured as an FFF printing device, i.e. as a Fused Filament Fabrication printing device. In particular, the 3D printing device 10 is configured as an FDM printing device, i.e. as a Fused Deposition Modeling printing device. The 3D printing device 10 is provided for printing high-performance plastics. The 3D printing device 10 is provided for printing PAEK plastics. PEEK and/or PEKK is/are printed with the 3D printing device 10.

In this regard, a printing material 16 is configured as a filament. Furthermore, the printing material 16 has a component that consists of PEEK and/or PEKK. Furthermore, the printing material 16 has a further component that consists of a material that differs from PEEK and PEKK. Fundamentally, however, it would also be conceivable that the printing material 16 consists entirely of PEEK and/or PEKK.

The 3D printing device 10 has a frame 53. The frame 53 is configured as an aluminum frame. The frame 53 has the dimensions 350 mm in length, 560 mm in height, and 350 mm in width, as an example. Fundamentally, however, any other dimensions that appear practical to a person skilled in the art would be conceivable. Furthermore, the 3D printing device 10 has a housing 54. The housing 54 has multiple panels that are attached to the frame 53 in the form of a covering. The panels consist of anodized aluminum. Fundamentally, however, a different material that appears practical to a person skilled in the art would also be conceivable. The housing 54 has an opening 56 on its front side, by way of which opening a construction space of the 3D printing device 10 is accessible. The opening 56 can be closed off by way of a door that is not visible in any detail. The door consists of a laminated safety glass. The construction space forms a lower level of the 3D printing device 10 (FIG. 1).

On an underside of the construction space, there is a basic unit 20. The 3D printing device 10 has the basic unit 20. The basic unit 20 has a printing baseplate 22, on which printing takes place during a printing procedure. The printing baseplate 22 can be heated. The printing baseplate 22 can be heated in regulated manner. The printing baseplate 22 is configured so that it can be heated, in regulated manner, in segments; this cannot be seen in any detail. A temperature of the printing baseplate 22 can be regulated by way of a control and regulation unit 44 of the 3D printing device 10. The segments of the printing baseplate 22 are configured to be controlled separately. The segments of the printing baseplate 22 can be heated separately, to different intensities, by way of the control and regulation unit 44 of the 3D printing device 10. The printing baseplate 22 is generally heated uniformly to 100° C. during operation. Fundamentally, however, alternative temperature control of the printing baseplate 22 would also be conceivable. Furthermore, the printing baseplate 22 has a glass plate 58 on a top side. During a printing procedure, printing takes place onto the glass plate 58. The glass plate 58 is needed to allow the printing material 16, in particular the PEEK, to adhere during the printing procedure. The printing baseplate 22 is configured so as to move in the Z direction. The printing baseplate 22 is configured so that it can move in the Z direction by way of a drive unit, which cannot be seen in any detail. The drive unit of the printing baseplate 22, which cannot be seen in any detail, is controlled by the control and regulation unit 44 of the 3D printing device 10. Furthermore, the basic unit 20 has a cooling device 24. The cooling device 24 is provided for active cooling of the printing baseplate 22. The cooling device 24 is provided for shock-like cooling of the printing baseplate 22. A cooling progression of the printing baseplate 22 can be controlled by way of the cooling device 24. The cooling device 24 is disposed underneath the printing baseplate 22. The cooling device 24 is configured as a water-cooling device. For cooling of the printing baseplate 22, water is circulated in the cooling device 24, and this water is conducted through cooling ribs, which cannot be seen in any detail, at a different location, in order to emit heat. Fundamentally, however, a different embodiment of the cooling device 24, which appears practical to a person skilled in the art, would also be conceivable.

Here, the printing volume of the 3D printing device 10 amounts to 155 mm by 155 mm by 155 mm, as an example. Fundamentally, however, a different printing volume that appears practical to a person skilled in the art would also be conceivable.

Furthermore, the 3D printing device 10 has a printing head unit 12. The printing head unit 12 is provided, in one operating state, for melting a printing material 16 formed by a high-performance plastic. The printing head unit 12 is provided, in one operation, for melting a printing material 16 formed by PEEK and/or PEKK. The printing head unit 12 has a basic body 46. The basic body 46 of the printing head unit 12 consists of an aluminum block. Furthermore, mountings 60, 62 for attaching an X-positioning rod 64 and a Y-positioning rod 66 are disposed on the basic body 46. The printing head unit 12 is connected with the frame 53 of the 3D printing device 10 by way of the X-positioning rod 64 and the Y-positioning rod 66, in a manner that cannot be seen in any detail. X-Y-positioning of the printing head unit 12 is implemented by means of stepper motors, which cannot be seen in any detail. The stepper motors, which cannot be seen in any detail, move the X-positioning rod 64 and the Y-positioning rod 66 of the printing head unit 12. The stepper motors are connected with the X-positioning rod 64 and the Y-positioning rod 66 by way of toothed belts, which cannot be seen in any detail. The stepper motors can be controlled by the control and regulation unit 44 of the 3D printing device 10. The printing head unit 12 can be moved by the control and regulation unit 44, by way of the stepper motors.

Furthermore, the printing head unit 12 has a Hot End 48. The Hot End 48 is disposed on the basic body 46 of the printing head unit 12. The Hot End 48 is configured so as to be removed separately from the basic body 46. The Hot End 48 is configured to be removable without tools. The Hot End 48 has a nozzle 42 and a nozzle heating system 68. The nozzle 42 of the printing head unit 12 is connected with the basic body 46 of the printing head unit 12. The nozzle 42 is configured to be removed separately from the basic body 46. The nozzle 42 can be pulled downward out of the basic body 46. In this regard, the nozzle 42 is secured, to prevent it from unintentionally falling out, only by way of a securing device that cannot be seen in any detail. The nozzle heating system 68 is provided for heating the nozzle 42 during operation. The nozzle heating system 68 has an aluminum block having a length of 20 mm, which is heated by means of two resistance heating elements, to approximately 340° C. to 400° C. The temperature is recorded and monitored by means of a thermocouple, which cannot be seen in any detail. The aluminum block surrounds the nozzle 42. Fundamentally, however, it would also be conceivable that the nozzle 42 is disposed only behind the nozzle heating system 68, and that the printing material 16 is melted directly in the nozzle heating system 68.

Fundamentally, however, other embodiments of the nozzle heating system 68 that appear practical to a person skilled in the art are also conceivable. During operation in the printing head unit 12, a printing material 16 is conducted into the nozzle 42 through a channel 70 in the basic body 46. In the nozzle 42, the printing material 16 is melted by way of the nozzle heating system 68, so that it can be pressed out of the nozzle 42. In this regard, the printing material 16 is melted in the region of the nozzle heating system 68, and extruded by way of an outlet opening 72 of the nozzle 42.

The nozzle 42 of the printing head unit 12 has a hardness of at least 200 HV 10 on an inner side 74. The nozzle 42 has a hardness of more than 2000 HV 10 on an inner side 74. The nozzle 42 of the printing head unit 12 has a coating having a hardness of at least 200 HV 10 on an inner side 74. The nozzle 42 of the printing head unit 12 has a coating, on an inner side 74, which consists of a ceramic. The coating consists of tungsten carbide. Fundamentally, however, other materials and/or coatings for the nozzle 42 of the printing head unit 12 that appear practical to a person skilled in the art are conceivable. A remainder of the nozzle 42 consists of brass.

Furthermore, different shapings of the nozzle 42 of the printing head unit 12 are conceivable. In the following, three possible shapings are described. The reference symbols of the different nozzles 42, 42', 42" are differentiated, in this regard, by means of apostrophes, in each instance. The nozzles 42, 42', 42" can all be mounted on the basic body 46 of the printing head unit 12, in each instance.

In a first embodiment, the nozzle 42 has a short guide region 76 and a long mouth region 78. The mouth region 78 is divided, in this regard, into two partial regions 80, 82. In a first partial region 80 of the mouth region 78, facing away from the outlet opening 72, an inside diameter of the nozzle 42 decreases from the guide region 76, along a main expanse direction 84 of the nozzle 42, in the direction of the outlet opening 72, wherein a reduction of the inside diameter decreases to at least approximately zero in the direction of the second partial region 82. In a second partial region 82 of the mouth region 78, facing the outlet opening 72, an inside diameter of the nozzle 42 decreases once again, along a main expanse direction 84 of the nozzle 42, in the direction of the outlet opening 72. In a region ahead of the outlet opening 72, the inner side 74 of the nozzle 42 has a conical inner contour, narrowing toward the outlet opening 72. The inner contour of the outlet opening 72 of the nozzle 42 is cylindrical. A size of the outlet opening 72 is large. In this way, great printing speeds can be implemented. Furthermore, material deposits in the nozzle 42 can be prevented by means of the multiple partial regions 80, 82 of the mouth region 78 (FIG. 5A).

In a second embodiment, the nozzle 42' has a long guide region 76' and a short mouth region 78'. In this regard, the guide region 76' has a constant inside diameter. On an inner side 74' of the nozzle 42', in the guide region 76', fine grooves are introduced. The grooves extend parallel to a main expanse direction 84' of the nozzle 42'. In this way, in particular, an advantageously high surface quality can be achieved. Furthermore, when using printing material 16 to which fibers are added, an orientation of the fibers at a surface of the printing material 16 can be achieved. In this way, in turn, a high surface quality can be achieved even when using fibers in the printing material 16. In the mouth region 78', an inside diameter of the nozzle 42' decreases from the guide region 76', along a main expanse direction 84' of the nozzle 42', in the direction of the outlet opening 72'. In the mouth region 78', the inner side 74' of the nozzle 42' has a conical inner contour, narrowing toward the outlet opening 72'. The inner contour of the outlet opening 72' of the nozzle 42' is cylindrical. A size of the outlet opening 72' is small. The outlet opening 72' has a diameter of 0.4 mm. Fundamentally, however, another diameter that appears practical to a person skilled in the art would also be conceivable. In this way, great printing precision can be implemented (FIG. 5B).

In a third embodiment, the nozzle 42" has a long guide region 76" and a short mouth region 78". Furthermore, the nozzle 42" has a structural element 86". The structural element 86" is provided for generating a turbulent flow in the nozzle 42". The structural element 86" is disposed on an inner side 74" of the nozzle 42". The structural element 86" is formed by a spiral structure that guides the printing material 16 through the nozzle 42" in spiral shape or brings about a spiral-shaped movement of the printing material 16 in the nozzle 42". Fundamentally, however, another embodiment of the structural element 86" that appears practical to a person skilled in the art would also be conceivable. By means of the structural element 86", in particular, a turbulent flow can be achieved in the nozzle 42". In this way, in particular, clogging of the outlet opening 72" can be prevented, even in the case of small outlet openings 72". In particular, in this way clogging of the outlet opening 72" can be prevented even when using fibers in the printing material 16 (FIG. 5C).

Additionally or alternatively, it would also be conceivable that at least one of the nozzles 42, 42', 42" or a further nozzle has an adjustable outlet opening 72, 72', 72". In this regard, it would be conceivable, in particular, that a shape and/or a diameter of the outlet opening 72, 72', 72" can be changed on the nozzle 42, 42', 42". In this way, in particular, a shape and/or a diameter of the outlet opening 72, 72', 72" can be adapted to a current printing process. In particular, the outlet opening 72, 72', 72" of the nozzle 42, 42', 42" could be adapted to current requirements, such as, in particular; a thickness and/or a shape of a layer to be printed.

During operation, a switch can be made between the different nozzles 42, 42', 42". In this regard, switching of the nozzles 42, 42', 42" takes place manually. Furthermore, however, instead of an individual nozzle 42, 42', 42", a nozzle switching unit 45 can also be mounted on the basic body 46 of the printing head unit 12. In this regard, the nozzle switching unit 45 can be installed, in particular, in place of a nozzle 42, 42', 42". The printing head unit 12 has the nozzle switching unit 45. The nozzle switching unit 45 is configured as a nozzle turret. The nozzle switching unit 45, in turn, has three nozzles 42, 42', 42". Fundamentally, however, a different number of nozzles 42, 42', 42" that appears practical to a person skilled in the art would also be conceivable. Here, the nozzle switching unit 45 has the three nozzles 42, 42', 42" that have already been described, as an example. Fundamentally, however, it would also be conceivable that the nozzle switching unit 45 has further different nozzles. The nozzle switching unit 45 generally has, in particular, nozzles 42, 42', 42" having different diameters and/or shapes of outlet openings 72, 72', 72" Furthermore, the nozzle switching unit 45 has a turntable 88 disposed opposite the basic body 46 of the printing head unit 12. The nozzles 42, 42', 42" are disposed on a side of the turntable 88 facing away from the basic body 46. By means of rotating the turntable 88, it can be manually selected which nozzle 42, 42', 42" is to be connected with the channel 70 in the basic body 46. Fundamentally, however, it would also be conceivable that the nozzle switching unit 45 can be controlled directly by the control and regulation unit 44 of the 3D printing device 10. In this way, the result could be achieved that the control and regulation unit 44 automatically selects an optimal nozzle 42, 42', 42" as a function of a printing process. Fundamentally, however, it would also be conceivable that the control and regulation unit 44 displays to an operator, by way of a display unit that cannot be seen in any detail, which nozzle 42, 42', 42" is required for a current printing process.

Furthermore, the 3D printing device 10 has a sensor unit 38, which is provided for direct measurement of a pressure of the printing material 16 in the printing head unit 12. The sensor unit 38 is provided for direct measurement of a relative pressure of the printing material 16 in the printing head unit 12, relative to an ambient pressure. The sensor unit 38 is configured as a pressure sensor. The sensor unit 38 has at least one sensor element 40, which is disposed in a nozzle 42 of the printing head unit 12. The sensor element 40, which is configured as a sensor tip and is provided for recording a pressure, projects through an opening in the basic body 46 as well as an opening in the nozzle 42 of the printing head unit 12, into an interior of the nozzle 42. When using a nozzle switching unit 45, the sensor element 40, which is provided for recording a pressure, projects through the opening in the basic body 46 as well as an opening in the holder of the nozzle switching unit 45 of the printing head unit 12, into an interior of the nozzle switching unit 45.

Furthermore, the 3D printing device 10 has an active cooling unit 34. The active cooling unit 34 is configured as an active water-cooling unit. The active cooling unit 34 is provided for active cooling of temperature-critical components. The active cooling unit 34 is provided for cooling temperature-critical components that are situated in the immediate vicinity of the printing head unit 12. The active cooling unit 34 is provided, among other things, for actively cooling a sensor unit 36 that is disposed on the printing head unit 12. The active cooling unit 34 is provided for cooling a sensor unit 36 that is configured as a measuring sensor and disposed on the printing head unit 12. The sensor unit 36 is configured as a calibration sensor, which is provided for measuring the printing baseplate 22 and/or a printed object 28, for calibration but also for real-time measurement of the printed object 28. The sensor unit 36 is disposed on the printing head unit 12, in order to allow movement of the sensor unit 36 without further actuators. The sensor unit 36 is disposed directly on the basic body 46 of the printing head unit 12. Furthermore, the cooling unit 34 is provided for cooling the bearings 60, 62 of the X-positioning rod 64 and of the Y-positioning rod 66. For this purpose, the active cooling unit 34 is integrated into the printing head unit 12. The active cooling unit 34 has a cavity 90 in the interior of the basic body 46 of the printing head unit 12. Distilled water is conveyed in the cavity 90, by way of a pump that is disposed outside of the basic body 46 and cannot be seen in any detail, which water is provided for cooling the bearings 60, 62 as well as the sensor unit 36. The pump is connected with the cavity 90 by way of silicone hoses. In this regard, the water is first conveyed through the cavity 90 and subsequently through cooling ribs, which cannot be seen in any detail. The cooling ribs are cooled by means of a fan. Cooling of the basic body 46 of the printing head unit 12 furthermore prevents premature melting of the filament and thereby adhesion to the wall of the channel 70.

In addition or alternatively, it would also be conceivable that the 3D printing device 10 has a cooling unit that is provided for making available a barrier layer between a warm region and a cold region, in at least one operating state, in order to generate a defined gas stream, in particular an air stream, between the warm region and the cold region.

Furthermore, the 3D printing device 10 has a feed device 14. The feed device 14 is provided, in at least one operation, to feed a printing material 16 to the printing head unit 12. The feed device 14 is provided for feeding the printing material 16 to the printing head unit 12 in the form of a filament. The feed device 14 is disposed on a rear of the housing 54 of the 3D printing device 10. The feed device 14 is configured as a Bowden extruder. Fundamentally, however, any other configuration of the feed device 14 that appears practical to a person skilled in the art would also be conceivable. The feed device 14 has a transport element 18. The transport element 18 is configured as a transport roller. The transport element 18 is driven by a drive unit of the feed device 14. The drive unit is configured as an electric motor. The transport element 18 is provided, in at least one operating state, for movement of the printing material 16 at a defined advancing speed. A printing material 16 configured as a PEEK filament is conveyed in defined manner by way of the feed device 14. For this purpose, the feed device 14 pulls the printing material 16 out of a printing material holding unit 92 of the 3D printing device 10.

The printing material holding unit 92 is also disposed on a rear of the housing 54 of the 3D printing device 10. The printing material holding unit 92 is screwed onto a rear of the housing 54. The printing material holding unit 92 has a cylindrical basic shape. The printing material holding unit 92 serves to hold a filament spool 94 in rotating manner. For this purpose, the printing material holding unit 92 has a cylindrical outer wall 96, which delimits the printing material 16 toward the outside in an inserted state. In particular, in the case of filaments, in this way the printing material 16 can be prevented from unrolling on its own, due to its inherent tension. In particular, in the case of polymer printing materials 16 having a high flexural modulus, use of the printing material 16 on a filament spool 94 is difficult. The reason for this is that the elastic energy that is stored in the material is so great that as soon as the material is deformed in an elastic range, it tends to return to its original shape. However, since the printing material 16 must be unrolled in order to be used in the 3D printing device 10, the printing material holding unit 92 can prevent the printing material 16 from unrolling in uncontrolled manner and possibly even becoming tangled. The printing material holding unit 92 is designed for filament spools 94 having an outside diameter of 200 mm or 100 mm, as well as having an inside diameter of not less than 43 mm. Fundamentally, however, other dimensions that appear practical to a person skilled in the art would also be conceivable. A slit 98 is disposed in the outer wall 96 of the printing material holding unit 92. The slit 98 has a thickness of approximately 35 mm in width, as an example. The printing material 16 can be pulled out of the printing material holding unit 92 by the feed device 14 by way of the slit 98. The feed device 14 and the printing material holding unit 92 are disposed at a distance from one another. In this way, in particular, partial stress relief of the printing material 16, configured as a filament, can be achieved. In this way, processing can be advantageously improved.

In FIG. 8B, an alternative embodiment of the printing material holding unit 92' is shown. The alternative printing material holding unit 92' also has a cylindrical basic shape. The alternative printing material holding unit 92' is configured in claw shape on an outer wall 96'. In this regard, the printing material holding unit 92' is provided for accommodating the printing material 16 directly. In this regard, the printing material 16 is mounted directly in the printing material holding unit 92'. For this purpose, the printing material holding unit 92' engages around the printing material 16, wherein the printing material 16', configured as a filament, presses outward against the surrounding outer wall 96' of the printing material holding unit 92' due to its inherent tension. In this way, it is possible to do without an additional filament spool 94. The alternative printing material holding unit 92' can be used as an alternative to the printing material holding unit 92.

Furthermore, the 3D printing device 10 has an optional magazine 51 for holding different printing materials 16. In this regard, the magazine 51 is indicated with a broken line in FIG. 2. Multiple printing material holding units 92 are accommodated in the magazine 51, in particular having different printing materials 16. In this regard, in particular, a switch can be made between different printing materials 16, manually, by way of the magazine 51, by clamping different filaments in the feed device 14; this cannot be seen in any detail. Fundamentally, however, it would also be conceivable that a switch takes place automatically. In this regard, different printing materials 16 are used by the 3D printing device 10, as a function of a color and/or strength that is to be achieved for the printed object 28 to be printed.

In one operation, the printing material 16 is conveyed to the printing head unit 12 by the printing material holding unit 92, by way of the feed device 14. The pressure in the printing head unit 12 occurs, in this regard, as the result of the printing material 16 itself, which is configured as a filament and conveyed by the feed device 14. A pressure in the printing head unit 12 is therefore controlled by way of the feed device 14. The feed device 14 is controlled by the control and regulation unit 44 of the 3D printing device 10. A pressure of the printing material 16 in the printing head unit 12 can be lowered or raised as a function of a set power of the drive unit of the feed device 14. The printing material 16 is conducted into an interior of the housing 54 of the 3D printing device 10 by way of an upper plane situated above the printing head unit 12, and there is passed to the printing head unit 12, in a manner that cannot be seen in any detail.

Viewed along the printing material 16, a drying unit 50 is disposed between the feed device 14 and the printing head unit 12. The 3D printing device 10 has the drying unit 50. The drying unit 50 is provided for drying the printing material 16 before it is fed to the printing head unit 12. The drying unit 50 is provided for withdrawing water from the printing material 16 before it melts. In this regard, drying takes place by way of heating elements, in a manner that cannot be seen in any detail. The drying process of the printing material 16 is integrated into the 3D printing device 10, in this regard. Fundamentally, however, it would also be conceivable that the printing material 16 is dried separately before use.

Furthermore, the 3D printing device 10 has at least one surface heating unit 26 disposed opposite the printing baseplate 22. The surface heating unit 26 is provided for partially heating a printed object 28 that is disposed on the printing baseplate 22 from a direction that differs from the printing baseplate 22. The surface heating unit 26 is provided for partially heating the printed object 28 from above. The surface heating unit 26 is provided for significantly increasing a layer adhesion of the layers of printing material 16, which are applied individually. The printing baseplate 22 and the surface heating unit 26 are structured so as to be movable relative to one another. The printing baseplate 22 is structured to be movable in the Z direction, whereas the surface heating unit 26 is structured to be movable in the X direction and the Y direction. For this purpose, the surface heating unit 26 is disposed in a fixed position relative to the printing head unit 12. The surface heating unit 26 is firmly connected with the at least one printing head unit 12. In this regard, the surface heating unit 26 is moved together with the printing head unit 12. The surface heating unit 26 is disposed in a plane 3 mm above and parallel to a printing plane of the nozzle 42 of the printing head unit 12. The surface heating unit 26 is supplied with energy by a power supply unit, which cannot be seen in any detail. The surface heating unit 26 has multiple heating elements 30. The heating elements 30 have glow wires. Fundamentally, however, any other embodiment of the heating elements 30 that appears practical to a person skilled in the art is also conceivable. The heating elements 30 are disposed on a mica plate 100. The mica plate 100 is disposed above the heating elements 30. The heating elements 30 are provided for heating the air layer between the printing head unit 12 and the printed object 28. In this regard, the heat is transferred to the printed object 28 by way of the air layer. As a result, the surface of the layers of the printed object 28 that have already been printed is activated, in order to guarantee advantageous adhesion to a next layer. Furthermore, the heat distribution of the printed object 28 can be improved by means of the additional heat. The temperature of this air layer is recorded and regulated by way of a temperature sensor, which cannot be seen in any detail. Fundamentally, however, it would also be conceivable that a temperature of the printed object 28 is monitored by way of heat image camera. In this regard, regulation takes place by means of the control and regulation unit 44. Partial thermal insulation upward can be achieved by way of the mica plate 100.

In this regard, the surface heating unit 26 can have different geometries, in particular. In a first embodiment, the surface heating unit 26 is disposed in a plane, so that heat concentration 102 takes place directly below the surface heating unit 26 (FIG. 6A). In a second embodiment, a heat concentration 102' of the surface heating unit 26' is increased in size, in that end regions of the surface heating unit 26' are angled away from a central region (FIG. 6B).

The heating elements 30 of the surface heating unit 26 are configured so that they can be controlled separately from one another. Each of the heating elements 30 is connected with a variable resistor, which cannot be seen in any detail, in each instance, by way of which a heating power of the heating element 30 can be controlled. The heating elements 30 are controlled by the control and regulation unit 44.

Furthermore, the 3D printing device 10 has a local heating unit 32, which is provided, in one operating state, for partially heating a printed object 28 before imprinting of a further layer by means of the printing head unit 12. The local heating unit 32 is provided for partially heating an uppermost layer of the printed object 28, in order to improve the adhesion between the individual printed layers, before imprinting of a further layer by means of the printing head unit 12. In this regard, it would furthermore be conceivable, in particular, that heating by means of the local heating unit 32 is partially eliminated, in targeted manner, in order to prevent targeted adhesion. The local heating unit 32 is configured as a heat radiator, in particular as an infrared heat radiator. The local heating unit 32 is disposed on the printing head unit 12. The local heating unit 32 is disposed so as to rotate about the printing head unit 12. The local heating unit 32 is disposed on the basic body 46 of the printing head unit 12 by way of a guide system 104. The local heating unit 32 can be rotated relative to the printing head unit 12 by way of a drive unit, which cannot be seen in any detail, by way of the guide system 104. In this regard, rotation takes place, in particular, in the printing plane. In this regard, the local heating unit 32 moves around the printing head unit 12. The control and regulation unit 44 controls a rotational position of the local heating unit 32. Furthermore, the control and regulation unit 44 controls a heating power of the local heating unit 32. In this regard, the control and regulation unit 44 controls the local heating unit 32 in such a manner that the local heating unit 32 of the printing head unit 12 is in a lead position during a printing process. By means of this lead, the result can be achieved, in turn, that an uppermost layer of the printed object 28 is partially melted immediately before application of a further layer.

The 3D printing device 10 has the control and regulation unit 44; The control and regulation unit 44 is disposed in the upper plane of the housing 54 of the 3D printing device 10. The control and regulation unit 44 is configured as a computer unit. The control and regulation unit 44 is configured as an integrated computer system. The control and regulation unit 44 has a Touch LCD display, a network connector, and a USB connector, which cannot be seen in any detail. Furthermore, the control and regulation unit 44 is provided for control and regulation of printing parameters. The control and regulation unit 44 is provided for control and regulation of printing parameters in real time. The control and regulation unit 44 serves for optimal adaptation of printing parameters to a printing process. The control and regulation unit 44 is provided for calculation of an equation regarding process quality. The control and regulation unit 44 is provided for adapting a printing speed, a temperature of the printing head unit 12, a temperature of the printing baseplate 22, a temperature of the printed object 28 or its surroundings and/or a pressure of the printing material 16 in the nozzle 42, as a function of a desired quality of the printed object 28 and/or of a desired printing speed.

During operation, a printing procedure is controlled and regulated by the control and regulation unit 44 of the 3D printing device 10.

Before an actual printing process, the object data of an object to be printed are transmitted to the 3D printing device 10. The objects are transmitted to the 3D printing device 10 in file formats such as .stl, .obj or .amf, which were created by a CAD software. Preferably, however, the object data of the object to be printed are transmitted to the 3D printing device 10 in a CAD file format that was especially developed for the 3D printing device 10. This special CAD file format contains not only a pure shape but also additional information such as tolerances, expansions, strength properties, etc. Subsequently, the CAD data are divided up into individual layers by means of a slicer software. In this regard, the slicer software transforms the 3D model of the CAD software into a G code of the 3D printing device 10. In this regard, division into layers can take place both externally and in the 3D printing device 10 itself. In this way, an advantageously great printing quality can be achieved, since a resolution of the 3D model can be adapted to a printing resolution of the 3D printing device 10. Furthermore, before the printing process, a shrinkage process of the printed object 28 during cooling after a printing process is calculated. For this purpose, the control and regulation unit 44 calculates a shrinkage behavior of the printed object 28 as a function of a geometry of the printed object 28, and adapts a dimensioning of the layers of the printed object 28 to this shrinkage behavior. In this regard, the layers are printed, in particular, to be larger than the 3D model, since the printed object 28 shrinks after the printing procedure. The print routine of the individual layers is translated into machine code and transmitted to a microcontroller of the control and regulation unit 44. The software of the control and regulation unit 44 is a web-based application. Subsequently, a printing process can be started. During the printing process, motors, the surface heating unit 26, the printing baseplate 22, the active cooling unit 34, the local heating unit 32, etc. are controlled by a programmable microcontroller. The position data of the motors are read out from the machine code by the microcontroller. Furthermore, process parameters such as temperatures of the printed object 28 are displayed during the printing procedure.

For a printing procedure, printing material 16 is pulled out of the printing material holding unit 92 by the feed device 14. The feed device 14 conveys the printing material 16 to the printing head unit 12. The printing material 16 is dried by means of the drying unit 50 before being fed to the printing head unit 12. Fundamentally, however, it would also be conceivable that the printing material 16 is dried separately from a printing process. Subsequently, the printing material 16, formed by a filament, is conveyed through the channel 70 of the basic body 46 of the printing head unit 12. Here, the printing material 16, formed by a filament, is actively cooled by means of the cooling unit 34 before being melted. Subsequently, the printing material 16 is conveyed into the nozzle 42 of the printing head unit 12, where the printing material 16 is melted by the nozzle heating system 68. After melting, the printing material 16 can be extruded by way of the outlet opening 72 of the nozzle 42.

Before printing of the printed object 28, a stabilization layer 52 is imprinted onto the printing baseplate 22. The stabilization layer 52 has a basic surface that is larger than a basic surface of a first layer of the printed object 28. The stabilization layer 52 is rounded off all around and completely filled with material. The stabilization layer 52 has an elliptical basic surface. In this regard, the layer is connected with the printed object 28 during the printing procedure of the printed object 28. In this way, warping of the printed object 28 can be reliably prevented. The stabilization layer 52 is removed from the printed object 28 after the printing procedure has been completely carried out. The stabilization layer 52 is required only during the printing procedure. After printing of the stabilization layer 52, the printed object 28 is imprinted directly onto the stabilization layer 52 (FIG. 10).

During the printing process, different heating elements 30 of the surface heating unit 26 are controlled as a function of parameters. The heating elements 30 of the surface heating unit 26 are controlled as a function of parameters of the printed object 28 and parameters of the printing procedure. The heating elements 30 of the surface heating unit 26 are controlled as a function of a shape and a composition of an uppermost layer of the printed object 28. In this regard, the heating elements 30 are controlled in such a manner that precisely those heating elements 30 of the surface heating unit 26 that are situated directly above the uppermost layer of the printed object 28 are activated. Thereby the result can be achieved that cooling of the uppermost layer is prevented. In FIG. 7, the shape of the uppermost layer of the printed object 28 is stylized by the line 106, whereas activated heating elements 30 of the surface heating unit 26 are represented by means of cross-hatching with wavy lines. Furthermore, partial regions of the printed object 28 are heated in targeted manner by means of controlling different heating elements 30 of the surface heating unit 26. If it is determined, by means of the temperature sensor that cannot be seen in any detail, that regions of the partial region of the printed object 28 that have already been printed are cooling too greatly, heating elements 30 above these regions are turned on to a higher degree in order to prevent further cooling.

In addition to the surface heating unit 26, the printed object 28 is partially heated by the local heating unit 32, in leading manner, before imprinting of a further layer. In this regard, an uppermost layer of the printed object 28, which has already been printed, is melted. For this purpose, the local heating unit 32 is constantly disposed ahead of the printing head unit 12 by the control and regulation unit 44 during the printing process, in the movement direction of the printing head unit 12. In this way, targeted melting together of layers can be achieved.

Furthermore, the printed object 28 is partially measured during the printing procedure. The printed object 28 is measured, during the printing procedure, by means of the sensor unit 36, which is configured as a calibration sensor. The printed object 28 is measured during the printing procedure in order to determine possible deviations between the printed object 28 and a 3D model stored in the control and regulation unit 44. As a function of a measurement result, printing parameters of the printing procedure are partially adapted. The printing parameters of a printing procedure are adapted as a function of a deviation between the printed object 28 and the 3D model stored in the control and regulation unit 44. In this way, possible printing imprecisions can be corrected during the printing procedure. Furthermore, the 3D printing device 10 can automatically carry out corrections of the printed object 28 as a function of the measurement result. If significant deviations between the printed object 28 and a 3D model stored in the control and regulation unit 44 occur in a measurement result, corrections can be carried out in targeted manner in order to correct the deviations.

In addition, it would also be conceivable that the 3D printing device 10 has an integrated material testing system, so that the strength properties of the printed object 28 can be checked during or after the printing procedure.

Furthermore, adaptation of printing parameters constantly takes place during the printing procedure, by means of the control and regulation unit 44. The control and regulation unit 44 optimally adapts the printing parameters to a printing process. For this purpose, the control and regulation unit 44 calculates an equation regarding process quality. A required printing speed, the temperature of the printing head unit 12, the temperature of the printing baseplate 22, the temperature of the printed object 28 or its surroundings, and a required pressure of the printing material 16 in the nozzle 42 are calculated by way of the equation, as a function of a desired quality of the printed object 28 and of a desired printing speed. The calculated printing speed, the temperature of the printing head unit 12, the temperature of the printing baseplate 22, the temperature of the printed object 28 or its surroundings, and the calculated pressure of the printing material 16 in the nozzle 42 is/are subsequently adjusted by the control and regulation unit 44. These printing parameters are monitored and regulated by the control and regulation unit 44, in order to obtain an optimal print result. Thus, a printing speed is set as a function of a pressure of the printing material 16 in the printing head unit 12. The diagram shown in FIG. 9 shows a relationship of the printing parameters of the 3D printing device 10 in simplified form. The diagram shows a relationship between the nozzle temperature $T_D$, the quality $Q_P$ of the printed object 28, and of the printing speed $v_P$. Furthermore, the diagram shows a first curve 108, which represents a direct relationship between the nozzle temperature $T_D$ and the quality $Q_P$ of the printed object 28, and a second curve 110, which represents a direct relationship between the printing speed $v_P$ and the quality $Q_P$ of the printed object 28.

Furthermore, a color of a printed object 28 is also influenced by means of adaptation of printing parameters. A color of a printed object 28 to be printed is influenced by means of adaptation of a printing temperature and a pressure of the printing material 16 in the printing head unit 12. The control and regulation unit 44 therefore adapts a printing temperature and a pressure of the printing material 16 as a function of a desired color of the printed object 28. However, other printing parameters that appear practical to a person skilled in the art are also conceivable for adaptation of a color of a printed object 28 to be printed.

After a printing process, the printing baseplate 22 is actively cooled for release of the printed object 28. In this regard, the printing baseplate 22 is cooled by way of the cooling device 24. Because of the different thermal expansion coefficients of the printing baseplate 22 and of the printed object 28, adhesion between the printing baseplate 22 and the printed object 28 is released. Subsequently, the printed object 28 can be removed from the 3D printing device 10 by way of the opening 56 in the housing 54.

The invention claimed is:

1. A 3D printing device comprising:
   at least one printing head unit;
   at least one feed device, which is configured, in at least one operating state, for feeding a printing material to the at least one printing head unit;
   a basic unit having at least one printing baseplate that is configured to be heated;
   an active cooling unit configured for actively cooling at least one sensor unit disposed on the at least one printing head;
   at least one surface heating unit disposed opposite the at least one printing baseplate;
   a local heating unit configured, in one operating state, for partially heating a printed object before imprinting of a further layer by the at least one printing head unit; and
   a drying unit configured for drying the printing material before the printing material is fed to the printing head unit;

wherein the at least one printing head unit is configured, in at least one operating state, for melting the printing material formed, at least in part, by a high-performance plastic;

wherein printing takes place during a printing process;

wherein said at least one surface heating unit is configured for heating, at least in part, a printed object disposed on the at least one printing baseplate, from a direction that differs from the at least one printing baseplate;

wherein the at least one printing baseplate and the at least one surface heating unit are structured to be moveable relative to one another;

wherein the at least one feed device is configured for feeding the printing material, in the form of a filament, to the at least one printing head unit;

wherein the at least one feed device has at least one transport element, which is configured, in at least one operating state, for moving the printing materials at a defined advancing speed;

wherein the basic unit has at least one cooling device, which is configured for active cooling of the at least one printing baseplate; and wherein the at least one printing head unit has at least one basic body and at least one hot end removable separately from the basic body.

2. The 3D printing device according to claim 1, wherein the at least one surface heating unit has multiple heating elements that are configured to be controlled separately from one another.

3. The 3D printing device according to claim 1, wherein the at least one sensor unit configured for direct measurement of a pressure of the printing material in the at least one printing head unit.

4. The 3D printing device according to claim 3, wherein the at least one sensor unit has at least one sensor element that is disposed in a nozzle of the at least one printing head unit.

5. The 3D printing device according to claim 1, comprising a control and/or regulation unit, which is configured for control and/or regulation of at least one printing parameter.

6. The 3D printing device according to claim 1, wherein the at least one printing head unit has at least one nozzle changing unit having at least two nozzles, which said at least one nozzle changing unit is configured for a disassembly-free switch between the at least two nozzles.

7. The 3D printing device according to claim 1,
wherein the at least one printing head unit has at least one nozzle;
wherein the at least one basic body of the at least one printing head unit and the at least one nozzle is configured to be separately removable from the basic body.

8. The 3D printing device according to claim 1, comprising a magazine for holding different printing materials.

9. A 3D printer having the 3D printing device according to claim 1.

* * * * *